US011727684B2

(12) United States Patent
Holden et al.

(10) Patent No.: US 11,727,684 B2
(45) Date of Patent: Aug. 15, 2023

(54) AUTOMATED VIRTUAL TRIPWIRE PLACEMENT

(71) Applicant: UBICQUIA IQ LLC, Fort Lauderdale, FL (US)

(72) Inventors: Samuel Leonard Holden, Montréal (CA); Morné Neser, Montréal (CA)

(73) Assignee: Ubicquia IQ LLC, Fort Lauderdale, FL (US)

( * ) Notice: Subject to any disclaimer, the term of this patent is extended or adjusted under 35 U.S.C. 154(b) by 153 days.

(21) Appl. No.: 17/408,115

(22) Filed: Aug. 20, 2021

(65) Prior Publication Data
US 2022/0058392 A1 Feb. 24, 2022

Related U.S. Application Data

(60) Provisional application No. 63/068,864, filed on Aug. 21, 2020.

(51) Int. Cl.
G06V 20/40 (2022.01)
G06T 7/246 (2017.01)
(Continued)

(52) U.S. Cl.
CPC .............. G06V 20/40 (2022.01); G06T 7/248 (2017.01); G06T 7/70 (2017.01); G06V 10/22 (2022.01);
(Continued)

(58) Field of Classification Search
CPC ........ G06V 20/40; G06V 10/22; G06V 10/50; G06V 10/62; G06V 20/54; G06T 7/248;
(Continued)

(56) References Cited

U.S. PATENT DOCUMENTS 9,412,269 B2 * 8/2016 Saptharishi ............... G06T 7/20
10,572,737 B2   2/2020 Leizerovich et al.
(Continued)

FOREIGN PATENT DOCUMENTS

EP    2277152 B1   10/2013

OTHER PUBLICATIONS

Korean Intellectual Property Office, International Search Report issued in connection with counterpart International Application No. PCT/US2021/047032, dated Dec. 14, 2021, 3 pages.
(Continued)

Primary Examiner — Amara Abdi
(74) Attorney, Agent, or Firm — Daniel C. Crilly; Thomas J. Satagaj

(57) ABSTRACT

One or more computing devices perform a method for placing a virtual tripwire onto grid points of a geocoordinate grid. A device processor directs a camera to capture a series of images within the camera's field of view. The processor identifies objects of interest within the images and determines movements of the objects through the images. The processor identifies directions of travel of the objects and determines variances in those directions of travel. The processor further determines vectors of median direction of travel for vector points corresponding to the objects on the grid. The processor then determines multiple candidate locations for placement of the tripwire across grid points of the grid in a direction approximately orthogonal to the direction of travel of at least one object of interest and automatically selects one of the candidate locations based on the vectors of median direction of travel and the travel direction variances.

20 Claims, 10 Drawing Sheets

(51) Int. Cl.
*G06T 7/70* (2017.01)
*G06V 10/22* (2022.01)

(52) U.S. Cl.
CPC ............... *G06T 2207/10016* (2013.01); *G06T 2207/30241* (2013.01); *G06T 2207/30242* (2013.01)

(58) Field of Classification Search
CPC ............. G06T 7/70; G06T 2207/10016; G06T 2207/30241; G06T 2207/30242
See application file for complete search history.

(56) References Cited

U.S. PATENT DOCUMENTS

| | | | |
|---|---|---|---|
| 10,572,738 | B2 | 2/2020 | Leizerovich et al. |
| 10,572,739 | B2 | 2/2020 | Leizerovich et al. |
| 10,572,740 | B2 | 2/2020 | Ribeiro et al. |
| 10,963,734 | B1 * | 3/2021 | Wang ................... G06F 18/254 |
| 2002/0005898 | A1 * | 1/2002 | Kawada ................... G08G 1/04 348/149 |
| 2018/0350231 | A1 * | 12/2018 | Stelzig ................. G08G 1/0116 |
| 2019/0073774 | A1 * | 3/2019 | Kwant ..................... G06T 7/143 |
| 2019/0185036 | A1 * | 6/2019 | Mian ....................... G08G 1/017 |
| 2019/0354773 | A1 | 11/2019 | Leizerovich et al. |
| 2019/0354774 | A1 | 11/2019 | Leizerovich et al. |
| 2019/0354775 | A1 | 11/2019 | Leizerovich et al. |
| 2019/0354776 | A1 | 11/2019 | Ribeiro et al. |
| 2019/0356885 | A1 * | 11/2019 | Ribeiro ..................... G06T 7/70 |
| 2020/0104975 | A1 * | 4/2020 | Banerjee ................. A63F 13/50 |
| 2020/0226769 | A1 * | 7/2020 | Das ......................... G06T 7/579 |
| 2021/0165410 | A1 * | 6/2021 | Liang ..................... G01C 21/36 |

OTHER PUBLICATIONS

Korean Intellectual Property Office, Written Opinion of the International Searching Authority issued in connection with counterpart International Application No. PCT/US2021/047032, dated Dec. 14, 2021, 3 pages.

* cited by examiner

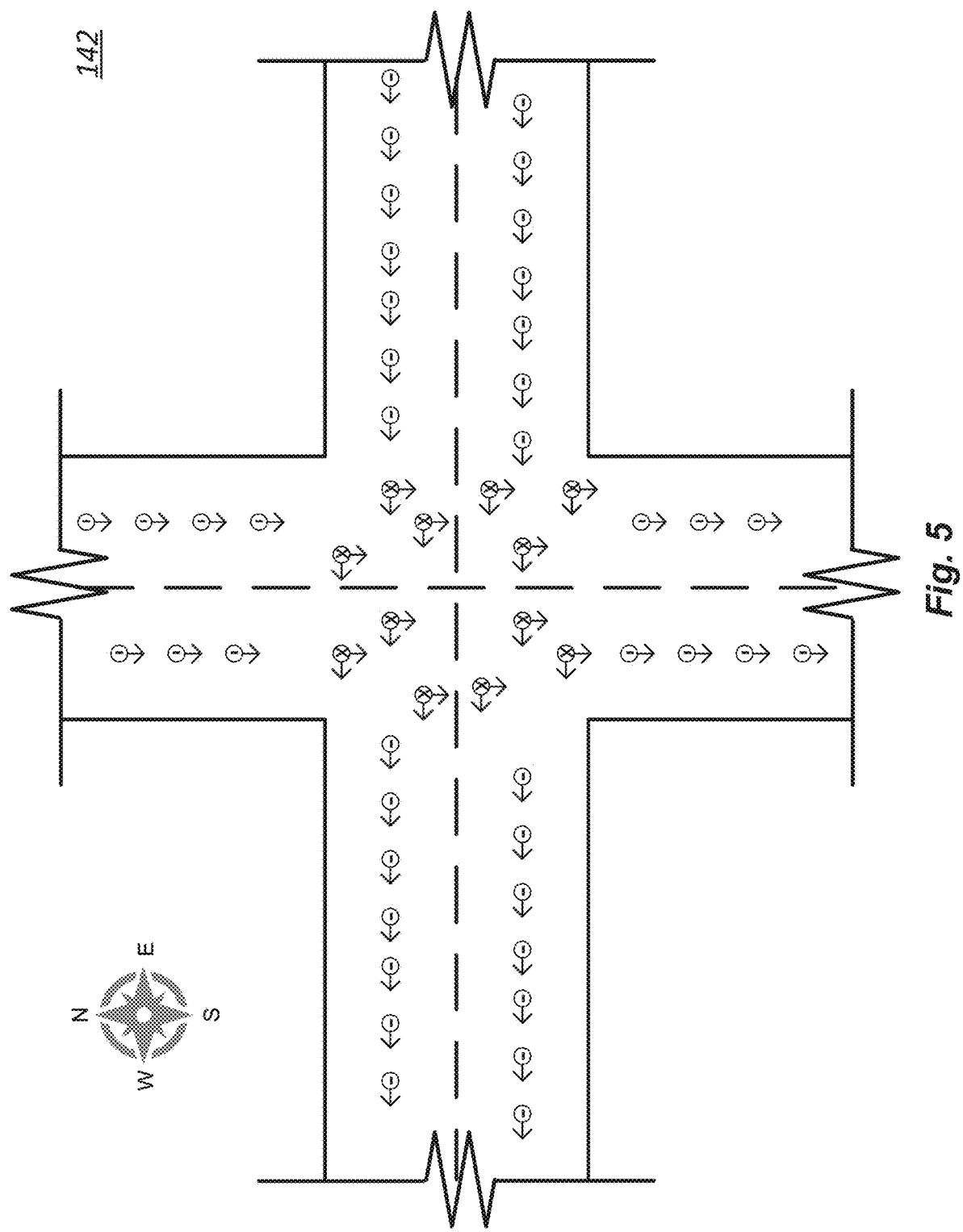

AUTOMATED VIRTUAL TRIPWIRE PLACEMENT

CROSS-REFERENCE TO RELATED APPLICATIONS

The present application claims priority upon and the benefit of U.S. Provisional Application No. 63/068,864, which was filed on Aug. 21, 2020 and is incorporated herein by reference in its entirety.

TECHNICAL FIELD

The present disclosure generally relates to a node aerially mounted above a roadway and arranged for video collection and analytics. More particularly, but not exclusively, the present disclosure relates to an aerially mounted node arranged to analyze video and automatically determine a suitable location for a virtual tripwire.

BACKGROUND

Towns, cities, and various other municipalities often have a desire to analyze traffic flows along various streets. For example, traffic flows may be analyzed to determine which streets transport a relatively large number of automobiles within a given time period. This information relating to traffic flows may be utilized to determine which streets to widen or narrow to accommodate a bicycle lane, for example. Such information may also be utilized to determine where to add, remove, or otherwise change warning signals (e.g., additional traffic lights, audible alerts, and the like), crosswalks, signage, and other useful city appurtenances.

In some traffic monitoring systems, video may be continually recorded, captured, or otherwise monitored at a section of a roadway. Video or captured images may be processed to determine the number of vehicles traveling along a street or other information relating to traffic flow, such as times of day when the street has a relatively high volume of traffic, a relatively low volume of traffic, or some other characteristics.

In one conventional case, for example, a particular portion of the street may be manually selected by a traffic engineer to monitor traffic passing through that portion of the street. In another particular example, the traffic engineer may manually select a particular tripwire or line extending in a direction perpendicular to a direction of movement of traffic along the, and in this case, the traffic passing across the line may be monitored.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which, in and of itself, may also be inventive.

BRIEF SUMMARY

The following is a summary of the present disclosure to provide an introductory understanding of some features and context. This summary is not intended to identify key or critical elements of the present disclosure or to delineate the scope of the disclosure. This summary presents certain concepts of the present disclosure in a simplified form as a prelude to the more detailed description that is later presented.

According to an aspect of an example embodiment, a method performed by one or more computing devices may determine where to place a virtual tripwire. A series of images of at least a portion of a roadway within a field of view of a camera may be obtained or captured from the camera. A grid point or a set of grid points corresponds, respectively, to a pixel or grouping of pixels of each image of the series of images. The series of images may be processed to identify objects of interest. Movement of the objects of interest may be determined through the series of images. A direction of travel of one or more points of each of the objects of interest through the set of grid points may be identified. A variance of the direction of travel for each of the objects of interest may be determined. A vector of median direction of travel for each of a plurality of vector points corresponding to the objects of interest on the set of grid points may be determined. A plurality of candidate locations for placement of a virtual tripwire on the set of grid points to monitor movement of at least some of the objects of interest through the series of images may be determined. The virtual tripwire may comprise a virtual line segment extending in a direction approximately orthogonal to the direction of travel along the at least the portion of the roadway. A particular candidate location for the placement of the virtual tripwire may be automatically selected, wherein the particular candidate location may be automatically selected from the plurality of candidate locations based on the plurality of vectors and on the associated variance of the direction of travel. Automatically selecting the particular candidate location for the placement of the virtual tripwire may include moving a sliding window across the grid points to identify a location that results in a minimization of the variance of direction of travel at the grid points overlapping the sliding window. In some cases, a placement of the virtual tripwire within the sliding window for the particular candidate location may be based on determining the placement within the sliding window that results in the minimization of the variance of direction of travel at the grid points. The images may be obtained by sampling video of the at least a portion of the pathway. The objects of interest may include one or more cars, one or more trucks, one or more bicycles, or one or more pedestrians. In some cases, a velocity of at least one of the objects of interest crossing the virtual tripwire may be estimated for a defined time interval based on respective locations of the pixels corresponding to the at least one of the objects of interest in successive images. In some cases, a count of how many vehicles cross the virtual tripwire for a defined time interval may be determined. In some cases, geocoordinates for a bounding perimeter for each of the objects of interest may be determined.

According to another aspect of an example embodiment, a system may include an aerially mounted node having a video camera and a first processor. The first processor may be arranged or operable to: obtain a series images of at least a portion of a roadway, wherein a grid point or a set of grid points corresponds, respectively, to a pixel or grouping of pixels of each image of the series of images; process images of the series of image to identify objects of interest; determine respective bounding perimeters for each of the objects of interest in at least one of the images of the series of images, wherein a respective bounding perimeter includes a geometric object surrounding a respective object of interest;

determine geocoordinates representing at least one point on or within the bounding perimeter for each object of interest; and transmit a message that includes the determined geocoordinates.

The system may further include a remote computing device having a second processor. The second processor may be arranged or operable to: receive at least a portion of the message transmitted from the aerially mounted node; determine movement of the objects of interest through the series of images; identify a direction of travel of one or more points of each of the objects of interest through the set of grid points; determine a variance of the direction of travel for each of the objects of interest; determine a vector of median direction of travel for each of a plurality of vector points corresponding to the objects of interest on the set of grid points; determine a plurality of candidate locations for placement of a virtual tripwire on the set of grid points to monitor movement of at least some of the objects of interest through the series of images, the virtual tripwire comprising a virtual line segment extending in a direction approximately orthogonal to the direction of travel along the at least the portion of the roadway; and automatically select a particular candidate location for the placement of the virtual tripwire, wherein the particular candidate location is selected from the plurality of candidate locations based on the plurality of vectors and on the associated variance of the direction of travel. The remote computing device may be also arranged or operable to automatically select the particular candidate location for placement of the virtual tripwire by moving a sliding window across the set of grid points to identify a location that results in a minimization of the variance of direction of travel at the grid points overlapping the sliding window. The remote computing device may be further arranged or operable to identify a placement of the virtual tripwire within the sliding window for the particular candidate location based on determining the placement within the sliding window that results in the minimization of the variance of direction of travel at the grid points.

The remote computing device may be further arranged or operable to determine geocoordinates for a bounding perimeter for each of the objects of interest. The particular candidate location may comprise a candidate associated with a determined low variance of the direction of travel. The remote computing device may be arranged or operable to estimate a velocity of at least one of the objects of interest crossing the virtual tripwire for a defined time interval based on respective locations of pixels corresponding to the at least one of the objects of interest in successive images. The remote computing device may be arranged or operable to count how many vehicles cross the virtual tripwire for a defined time interval.

According to yet one more aspect of an example embodiment, an article includes a non-transitory storage medium comprising machine-readable instructions executable by one or more processors to: process messages received from one or more aerially mounted nodes, at least one message including geocoordinates representing at least one point on or within a bounding perimeter of each object of interest of a plurality of objects of interest in at least one image of a series of images of at least a portion of a roadway obtained by the one or more aerially mounted nodes; determine movement of the objects of interest through the series of images; identify a direction of travel of one or more points of each of the objects of interest through the set of grid points; determine a variance of the direction of travel for each of the objects of interest; determine a vector of median direction of travel for each of a plurality of vector points corresponding to the objects of interest on the set of grid points; determine a plurality of candidate locations for placement of a virtual tripwire on the set of grid points to monitor movement of at least some of the objects of interest through the series of images, the virtual tripwire comprising a virtual line segment extending in a direction approximately orthogonal to the direction of travel along the at least the portion of the roadway; and automatically select a particular candidate location for the placement of the virtual tripwire, wherein the particular candidate location is selected from the plurality of candidate locations based on the plurality of vectors and on the associated variance of the direction of travel.

The machine-readable instructions may be further executable by the one or more processors to automatically select the particular candidate location for placement of the virtual tripwire by moving a sliding window across the set of grid points to identify a location that results in a minimization of the variance of direction of travel at the grid points overlapping the sliding window. The machine-readable instructions may be further executable by the one or more processors to identify a placement of the virtual tripwire within the sliding window for the particular candidate location based on determining the placement within the sliding window that results in the minimization of the variance of direction of travel at the grid points. The particular candidate location may include a candidate associated with a determined low variance of the direction of travel. The machine-readable instructions may be further executable by the one or more processors to estimate a velocity of at least one of the objects of interest crossing the virtual tripwire for a defined time interval based on respective locations of pixels corresponding to the at least one of the objects of interest in successive images.

According to an aspect of an example embodiment, a method performed by one or more processors may determine where to place a virtual tripwire. A series of images of at least a portion of a roadway within a field of view of a camera may be obtained or captured. A set of grid points may correspond to a pixel or grouping of pixels of each image of the series of images. The series of images may be processed to identify objects of interest. Movement of the objects of interest through the series of images may be determined. A direction of travel of one or more points of each of the objects of interest may be identified through the set of grid points. A variance of the direction of travel may be determined for the grid points. A plurality of vectors of median direction of travel may be determined for a plurality of vector points corresponding to the set of grid points. A plurality of candidate locations may be determined for placement of a virtual tripwire on the set of grid points to monitor movement of the one or more objects of interest through the series of images. The virtual tripwire may comprise a line segment extending in a direction approximately orthogonal to the direction of travel along the at least the portion of the roadway. A particular candidate location may be selected, from the plurality of candidate locations, for the placement of the virtual tripwire perpendicular to direction of travel which intersects grid points, based on the plurality of vectors, and on the associated variance of the direction of travel. An alert may be generated based on the selection of the particular candidate location for the placement of the virtual tripwire.

According to an aspect of another example embodiment, a system may be provided which may determine where to place a virtual tripwire. The system may include one or more video capture devices comprising at least a video camera and at least a first processor to obtain a series of images of at least a portion of a roadway. The one or more video capture devices may also process the images to identify objects of interest. The one or more video capture devices may additionally determine respective bounding perimeters for each of the objects of interest in at least one of the images of the series. The one or more video capture devices may further transmit a message comprising geocoordinates for the respective bounding perimeters of the objects of interest in the at least one of the images.

The system may also include a network device comprising at least a second processor to receive the message from the one or more video capture devices. The network device may also determine movement of the objects of interest through the series of images and identify a direction of travel of one or more points of each of the objects of interest through the set of grid points. The network device may additionally determine a variance of the direction of travel for the grid points and a plurality of vectors of median direction of travel for a plurality of vector points corresponding to the set of grid points. The network device may further determine a plurality of candidate locations for placement of a virtual tripwire on the set of grid points to monitor movement of the one or more objects of interest through the series of images. The network device may also select a particular candidate location, from the plurality of candidate locations, for the placement of the virtual tripwire perpendicular to direction of travel which intersects grid points, based on the plurality of vectors, and on the associated variance of the direction of travel. The network device may additionally generate an alert based on the selection of the particular candidate location for the placement of the virtual tripwire.

According to an aspect of another example embodiment, an article may comprise a non-transitory storage medium comprising machine-readable instructions executable by one or more processors. The instructions may be executable by the one or more processors to determine where to place a virtual tripwire. A series of images of at least a portion of a roadway within a field of view of a camera may be obtained or acquired. A set of grid points may correspond to a pixel or grouping of pixels of each image of the series of images. The series of images may be processed to identify objects of interest. Movement of the objects of interest through the series of images may be determined. A direction of travel of one or more points of each of the objects of interest may be identified through the set of grid points. A variance of the direction of travel may be determined for the grid points. A plurality of vectors of median direction of travel may be determined for a plurality of vector points corresponding to the set of grid points. A plurality of candidate locations may be determined for placement of a virtual tripwire on the set of grid points to monitor movement of the one or more objects of interest through the series of images. A particular candidate location may be selected, from the plurality of candidate locations, for the placement of the virtual tripwire perpendicular to direction of travel which intersects grid points, based on the plurality of vectors, and on the associated variance of the direction of travel. An alert may be generated based on the selection of the particular candidate location for the placement of the virtual tripwire.

Other features and aspects may be apparent from the following detailed description taken in conjunction with the drawings and the claims.

This Brief Summary has been provided to describe certain concepts in a simplified form that are further described in more detail in the Detailed Description. The Brief Summary does not limit the scope of the claimed subject matter, but rather the words of the claims themselves determine the scope of the claimed subject matter.

BRIEF DESCRIPTION OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which:

FIG. 5 is another set of information-bearing grid vectors on a generated image of another roadway representing directions of travel an associated variance for various object of interest.

DETAILED DESCRIPTION

Figure 1:
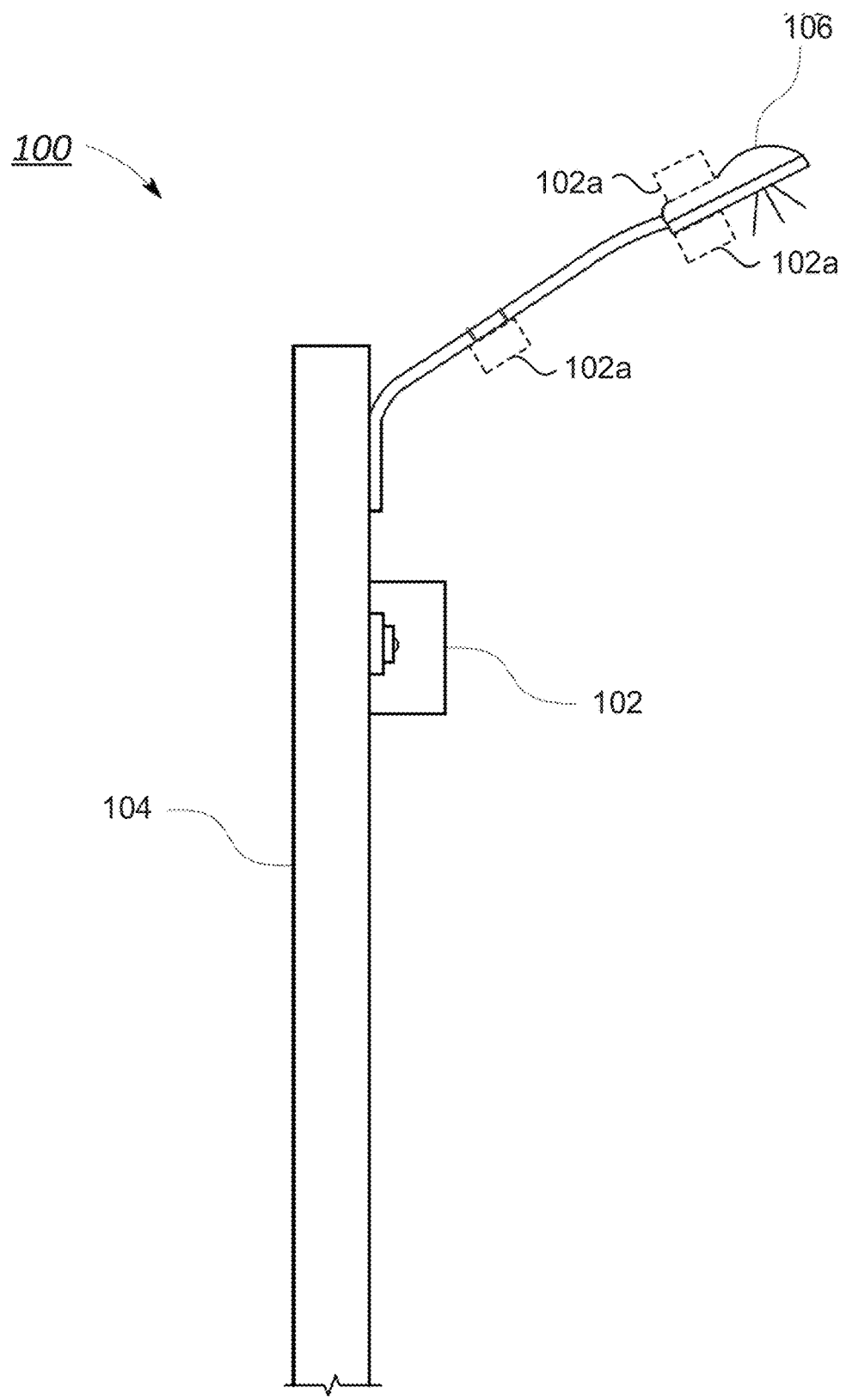
FIG. 1 is an embodiment of a streetlight assembly bearing an aerially mounted node arranged to detect near-miss conditions.

The present disclosure may be understood more readily by reference to this detailed description and the accompanying figures. The terminology used herein is for the purpose of describing specific embodiments only and is not limiting to the claims unless a court or accepted body of competent jurisdiction determines that such terminology is limiting. Unless specifically defined in the present disclosure, the terminology used herein is to be given its traditional meaning as known in the relevant art.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computing systems including client and server computing systems, as well as networks have not been shown or described in detail to avoid unnecessarily obscuring more detailed descriptions of the embodiments.

The device, method, and system embodiments described in this disclosure (i.e., the teachings of this disclosure) implement aerially mounted nodes (e.g., nodes mounted on streetlights above a roadway) that focus substantially downward, capture video, and perform or otherwise permit automatic analysis of virtual tripwires.

In conventional cases, a traffic engineer manually selects a particular tripwire or line extending in a direction that is substantially normal (i.e., perpendicular) to a direction of movement of traffic along the roadway such that traffic passing across the tripwire line may be monitored. The engineer may take this action to monitor traffic flow at a particular time of day, at a particular location, or for other reasons. Data collected from such analysis may lead to the addition or removal of traffic lanes (e.g., turn lanes, 'straight' lanes, bike lanes, bus lanes, or the like), changes in traffic light timing or patterns, crosswalks or changes thereto, or any other traffic-centric information. It has been learned by the inventors, however, that the manual selection of such a tripwire is often arbitrary and not representative of an optimal portion of the street along which to monitor traffic.

For example, a tripwire positioned in a first selected area of a roadway (e.g., location "A") may be located in a better position for traffic monitoring than a tripwire located in a second different selected area of the roadway in certain situations such as when trying to determine average speed on the roadway, number of vehicles that turn versus do not turn, average distance or time between vehicles, and the like. In one case, it is a goal is to determine an average speed or velocity of vehicles along the roadway. Here, it may be preferable for a tripwire to be placed at a location where vehicles typically travel at a constant speed, such as a position that is relatively far from intersections and/or traffic lights, which can cause drivers of vehicles to change speed. In another case, it is a goal is to determine how may vehicles turn in a particular direction at an intersection, and in this case, it may be optimal to place the tripwire at about 20 feet from the intersection rather than within 10 feet or more than 30 feet.

One or more embodiments, as discussed herein, generally teach an automated selection and/or placement of a virtual tripwire to monitor traffic along a roadway used for transportation of people and vehicles (e.g., automobiles, bicycles, pedestrians, and other moving objects and/or entities). In the field of video analytics, virtual tripwires may be used to monitor traffic count, density, speed, direction, or other characteristics of moving objects including people and vehicles. For example, an automated process may determine a location at which to place a virtual tripwire within a given camera's field of view based on certain criteria and without any human intervention in some cases and with only a small amount of human intervention (e.g., to identify the roadway, identify the type of data to be collected, and other such administrative information) in other cases.

A "virtual tripwire," as used herein, refers to a processor-generated virtual boundary within an image or series of images. A virtual tripwire represents one or more lines or line segments between two or more points on an image, a series of images, a set of grid points (e.g., a "grid" or grid of grid points), or some other collection of data. For example, if a camera is configured to capture multiple images (e.g., a plurality of images captured on a schedule, based on motion, or based on some other criteria) of the same location (e.g., a section of roadway in the field of view of the camera) as streaming video of discreet images continuously or intermittently (e.g., on a periodic basis), a virtual tripwire may represent a line extending between two pixels within the image or within corresponding geographical coordinates in the real world that correspond to such pixels.

Virtual tripwires may be utilized to directly or indirectly initiate action by a computing device. Within the context of traffic monitoring, for example, a virtual tripwire may be utilized to determine when to count a vehicle or otherwise monitor performance of actions of the vehicle based on the vehicle crossing the virtual tripwire threshold.

In embodiments of the present disclosure, a series of images of a vehicle roadway may be analyzed to automatically determine (i.e., without human intervention in the determination) an optimal location at which to place a virtual tripwire. In some embodiments, a single virtual tripwire may be placed in a certain camera's field of view corresponding to images captured by a single source camera. However, it should also be appreciated by one of skill in the art that in some embodiments, two or more virtual tripwires may be utilized, two or more cameras may be utilized, and processing to automatically determine the optimal location of any number of virtual tripwires may be performed locally (e.g., by a streetlight-based computing device), remotely, individually by a single computing device, collectively by a set of cooperating computing devices, and in any other suitable way. Virtual tripwires may be utilized to count the number of vehicles travelling along the roadway during a particular time interval, determine the average speed or velocity of the vehicles, count the number of vehicles which turn in a particular direction through an intersection, determine or trigger an analysis of the congestion on a particular section of roadway, determine the following distance of vehicles (e.g., average following distance, minimum following distance, maximum following distance, set of some or all following distances, and the like), determine or trigger an analysis of the effects of various traffic light timing patterns, determine or trigger an analysis of the effects of pedestrians, count the number of large commercial transportation vehicles, count the number of passenger vehicles, count the number and trigger an analysis of schedules of public transportation vehicles, count bicycle traffic, count pedestrians, and directly or indirectly cause or perform many other things, for example.

In one example, one or more still images or video is captured or otherwise obtained. The images or video is captured by one or more cameras having a field of view, or fields of view, respectively, along a vehicle roadway. Captured video may comprise a stream of two-dimensional video, three-dimensional video, infrared or otherwise enhanced video, or video/images in some other format in accordance with techniques known or learned by one of skill in the art. The video may be sampled at various intervals to obtain or capture a series of images. In some cases, for example, the video may be sampled 30 times per second or at a different sampling rate for different implementations. A sampling rate may be utilized that is at least partially based on available processing power or capacity for analyzing sampled images, and in at least some cases, the sampling rate may be dynamically adjustable. For example, a streetlight-based node having one or more cameras along with one or more processors may be able to capture and process high-definition video or images at 60 or more frames per second. Alternatively, such a streetlight-based node may only be able to capture and process video or images at 15 frames per second or less.

In one embodiment, a mapping between pixels of a captured image and real-world geographic coordinates, such as latitude/longitude coordinates, may be known a priori or may be determined for each of the sampled images. For example, if a video camera is substantially fixed or otherwise aimed in a particular direction, and the camera is configured or arranged to capture video in a field of view positioned at a relatively static location, a mapping may be known between various anchor points in sampled imagery of the video and real-world geocoordinates and/or a set of grid points. A roadway, for example, that includes a manhole cover, a pedestrian crosswalk, street curbs, a streetlight, or some other particular anchor points (e.g., objects, points of interest, markings, relationships between objects, or the like) may utilize such anchor point or points as a basis for mapping pixels of a sampled image to real-world geocoordinates. In at least some cases, the aerially mounted node will include positioning circuitry (e.g., a global positioning system (GPS) that provides a location of the node (e.g., longitude, latitude, altitude, and the like) within a geographical coordinate system, and using the node's location, real-world geocoordinates in the field of view of the node's camera may be mathematically determined within an acceptable accuracy.

Any suitable number of sampled images may also be processed to identify one or more travelling or stationary objects of interest along the roadway. For example, if a truck is travelling along the roadway, the truck may be an object of interest that is positioned in different locations in sampled images of the roadway at different points in time as the truck travels. If the truck is travelling relatively fast along a relatively straight path, the truck may quickly move from one side of the series of sampled images to an opposing side of the series of sampled images. On the other hand, if the truck is not moving, such as when the truck is stopped at a traffic light or in traffic congestion, the truck may be located in approximately the same location in successive images of a series of captured images. And along these lines, analysis may be performed in some cases to predict a future location of the truck, alone or in reference to other objects in the scene being analyzed. Any or all of the speed of the truck (e.g., true groundspeed, speed relative to other vehicles, or the like), trajectory of the truck, consistency or inconsistency of the truck's motion, or other such factors may all be considered in the analysis.

Processing of one or more of the sampled images may include generating a respective bounding perimeter for certain objects of interest in at least one of the images. An object of interest within an image may comprise one or more identified vehicles (e.g., an automobile, truck, bicycle, or the like), a pedestrian, an animal, a fire hydrant, a control signal, a utility box, an access panel, a manhole cover, a curb, a storefront, or any other object of interest. In some cases, a bounding perimeter refers to a geometric-shaped virtual object surrounding an object of interest within a geometric plane of the image. For example, if the image comprises a two-dimensional image, then a bounding perimeter may comprise an object (e.g., a box, rectangle, or some other enclosed object) surrounding the object of interest. In one example, the bounding perimeter may comprise a geometrically-shaped object that completely envelopes or surrounds the object of interest.

In accordance with one or more embodiments, video cameras may be disposed in, on, or otherwise in association with aerially mounted nodes on or around various streetlights. As used herein, an aerially mounted node may be a "video processing device," "video processing module," or some other such information capturing module that comprises a computing device having at least one video camera. In one particular embodiment, an aerially mounted node includes a housing (e.g., a package or other containment structure) fixedly or removably attached to a streetlight and positioned so that the video camera is capable of capturing video (i.e., data representing one or more still or streaming images that stand independently or as part of a stream of full or partial images) of a roadway. In one example, a video camera is arranged to capture a stream of video, and the computing device is arranged to sample the image data of the video stream at a periodic rate. The computing device, alone or in combination with other remotely located computing devices, may implement a neural network to process a series of captured video images. Such processing may be arranged to identify certain objects of interest and to determine danger zones for the objects.

In accordance with certain embodiments, one or more computing devices of, or otherwise associated with, an aerially mounted node may implement a neural network, such as a deep learning neural network. For example, such a neural network may learn via supervised learning, unsupervised learning, and/or reinforcement learning. In accordance with an embodiment, a neural network as discussed herein may comprise a Convolutional Neural Network (CNN) or a long short-term memory (LSTM) neural network, for example.

One or more processes carried out by the computing devices of, or otherwise associated with, an aerially mounted node may identify geocoordinates, such as latitude and longitude or some other coordinates, which correspond to different pixel locations in a captured image. Geocoordinates of a location of a bounding perimeter for objects of interest may be identified. An approximate leading point, center point, center of gravity, or other such designator may be determined for each object of interest (e.g., the bounding perimeter around the object of interest) in a series of one or more images. In one exemplary embodiment, if a bounding perimeter comprises a shape such as a rectangle surrounding an object of interest, coordinates of the edges of the bounding perimeter may be identified. The coordinates of the bounding perimeter may be utilized to determine an approximate leading edge, center, or some other point of interest of the object, such as a point located in an approximate middle of an area defined by the bounding perimeter. If a vehicle or other object of interest is in motion throughout a series of captured images, the approximate point of interest of the object is therefore also in motion throughout the series of the captured images. In at least some exemplary embodiments, locations of points of interest corresponding to the approximate center point of an object of interest through a series of captured images may be automatically utilized to determine whether, where, or whether and where to place a virtual tripwire.

In some embodiments, after a sufficient number of images (e.g., ones, tens, hundreds, thousands, millions, or some other number of images, which, when processed, demonstrate accurate determinations in more than 50%, 75%, 90%, 98%, or some other measure of accuracy) have been processed, movement of points corresponding to approximate points of interest of particular objects of interest through the images may be utilized to determine certain characteristics of each object of interest. For example, an approximate direction of movement of objects of interest through the series of images may be determined, estimates of an approximate speed or velocity of the objects of interest through the series of images may be determined, a degree of consistency or stability of motion of the objects of interest may be determined, and other characteristics may be determined too.

In one exemplary embodiment, each captured image may be associated with a time stamp corresponding to a time of day or some other time-base (e.g., coordinated universal time (UTC), global positioning system time, or the like) at which the image was captured. If approximate points of interest of an object of interest (e.g., a vehicle) travelling along a roadway are determined within a series of successively captured images, each of which are associated with time stamps, the speed or velocity of object of interest (e.g., the vehicle) can be estimated by determining a distance between the approximate points of interest of the images and accounting for the time difference between the time stamps for those images to estimate how far the object has traveled within a particular time threshold.

In some implementations, geocoordinates of corners of the bounding perimeter may be sufficient to identify the bounding perimeter. For example, a video camera of an aerially mounted node or a different computing device may capture images, and one or more processes thereof may locally process those images to identify objects of interest and corresponding bounding perimeters. The one or more processes may generate metadata or some other information identifying the geocoordinates corresponding to the bounding perimeters for objects of interest and the process or processes may transmit the metadata to a local or remote computing server for subsequent processing. In some implementations, both metadata and corresponding images may be transmitted to the computing server. In some implementations where processing bandwidth and/or transmission bandwidth is limited, for example, just the metadata may be processed by, or even transmitted to, the computing server. The computing server may receive the metadata and identify bounding parameters, motion, velocity, and other characteristics and conditions of the objects of interest.

In some cases, if bounding perimeters for objects of interest have a rectangular shape, the bounding perimeters may be defined by determining geocoordinates for the four corners of the bounding perimeters or determining geocoordinates for two of the four corners. Such geocoordinates may be transmitted from a transmitter of the aerially mounted node or other computing device to a network, such as a cloud-based network, for further processing. In some implementations, an approximate point of interest of some or all of the bounding perimeters may also be determined by the one or more processes, and geocoordinates for the approximate point of interest of an object of interest may be transmitted to the network for further processing. In other implementations, a remote computing server or some other network device may identify the approximate point of interest of an object of interest in a particular image based on the geocoordinates received from a transmitter of an aerially mounted node or other computing device, for example.

In implementations where both metadata and corresponding images are transmitted to a local or remote computing server, the metadata may comprise information that describes or characterizes a captured image and/or bounding perimeters within the captured image. In accordance with some implementations, the metadata may include time stamp data to identify when a particular image was captured, location information, an aerially mounted node identifier from which the image data was captured, or other suitable metadata. In some implementations where processing bandwidth and/or transmission bandwidth is limited, for example, just the metadata may be transmitted to the local or remote computing server. The computing server may receive the metadata and determine an optimal location at which to place one or more virtual tripwires for a particular image.

Subsequent to determining optimal locations for one or more virtual tripwires, information corresponding to the locations of such virtual tripwires may be stored in a local or remote repository (e.g., a memory device) or otherwise utilized for future processing of images received from the computing devices of, or otherwise associated with, an aerially mounted node. The captured images may include information corresponding to the virtual tripwire. In some embodiments, information, such as metadata, relating to the locations of such virtual tripwires, may be transmitted from a remote computing server or other such network device to the aerially mounted node or other device from which the captured images were obtained.

After the location of a virtual tripwire has been identified or otherwise determined, the virtual tripwire may be utilized to directly or indirectly cause certain traffic-related analytics to be performed for subsequently processed captured images, for example. In one particular embodiment, a virtual tripwire may be utilized as a threshold, which, if an object of interest travels across the plane of, one or more processes may be executed or otherwise directed to measure a count of traffic, density, speed, direction of travel, or other such characteristics of selected objects of interest.

In some embodiments, a report, such as a spreadsheet or other document, may be generated to identify analytics of traffic in a user-friendly manner. For example, the report may be utilized to determine locations along a roadway that may be unsafe (e.g., having an unacceptably high rate of incidence of collisions, near-misses, pedestrian or animal interactions, or the like) so that a determination may be made as to whether to reduce a speed limit, add a traffic light or a traffic sign, such as a stop sign, or take some other action.

In some implementations, an alert may be generated, for example, based on the analytics of monitored traffic. For example, if a relatively large number of vehicles are monitored (e.g., tens, dozens, hundreds, or more) or a relatively slow speed of the vehicles (e.g., less than 2 miles per hour (mph), less than 10 mph, less than 20 mph, or some other measure of speed) is determined, an alert may be generated to notify a traffic engineer that the timing of traffic lights cycling between green, yellow, and red should be adjusted. Such an alert may comprise the generation of a short message service (SMS) text message, electronic mail (email), or the sounding of an audible alarm to the traffic engineer, for example.

FIG. 1 is an embodiment of a streetlight assembly 100 bearing an aerially mounted node 102. The streetlight assembly 100 may include a light pole 104 of any suitable material, dimension, or other characteristics to which a luminaire 106 and an aerially mounted node 102 may be coupled or affixed, permanently or removably. The streetlight assembly 100 may be disposed along a roadway so that light emanating from luminaire 106 will illuminate at least a portion of the roadway (i.e., the streetlight assembly is positioned "above" the roadway). The placement of the streetlight assembly 100 above the roadway is selected to improve visibility and safety for drivers of vehicles, bicycles, pedestrians, and any others who might cross, intersect, or otherwise traverse the roadway. In at least some cases, aerially mounted nodes 102 are placed particularly on streetlight assemblies 100 proximate a pedestrian crosswalk.

For the avoidance of doubt, aerially mounted assemblies 102a are along the lines of aerially mounted assemblies 102, and individually or collectively, aerially mounted assemblies may be referred to herein as aerially mounted assemblies 102.

In a particular embodiment, the streetlight assembly 100 may have a height in excess of 20 feet. For example, an aerially mounted node 102 may be affixed at a location 20 feet above street level. In such an embodiment, coverage for video of the roadway may be several times as great (e.g., two times, four times, eight times, or some other factor) as the height at which video is obtained. Accordingly, in at least one embodiment, if video is captured from a height of 20 feet, a region of 80 feet in width, radius, diameter, or other such dimension may be observed or monitored via the video captured by the aerially mounted node 102. In the embodiment of FIG. 1, an aerially mounted node 102 may obtain electrical power from light pole 104, or the aerially mounted node 102 may include one or more batteries, such as rechargeable batteries, a solar-cell-based circuit, a connector integrated with the luminaire 106, or from some other source. Along these lines, one or more optional aerially mounted nodes 102a may be located on a support arm of the streetlight assembly 100, below a luminaire 106, above a luminaire 106, or in some other location.

Figure 2:
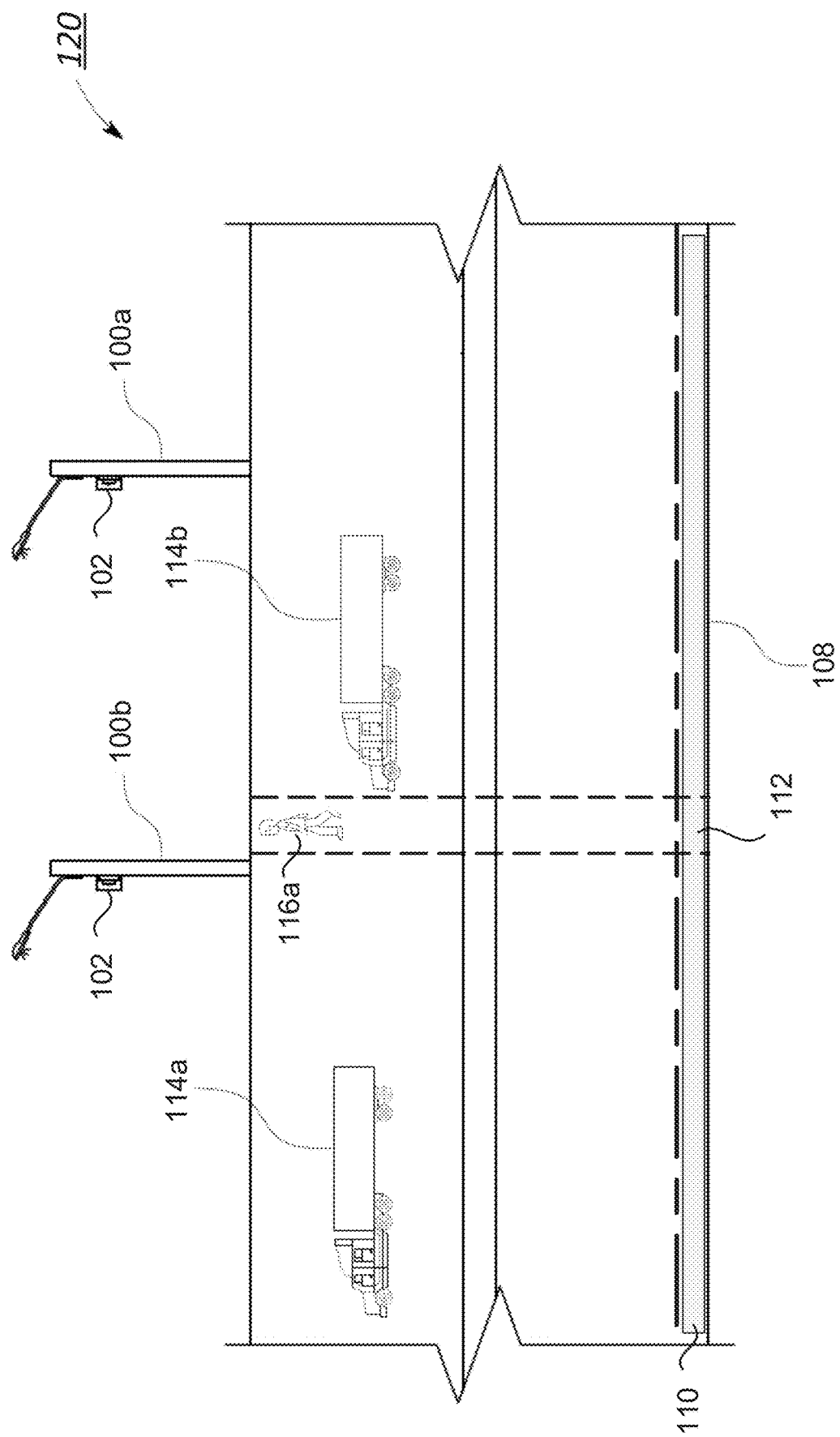
FIG. 2 is an embodiment of a system for monitoring traffic along a roadway.

FIG. 2 is an embodiment of a system for monitoring traffic 120 along a roadway 108. In the embodiment, two streetlight assemblies 100a, 100b are shown. A first streetlight assembly 100a and a second streetlight assembly 100b are along the lines of streetlight assembly 100 of FIG. 1. Each of the streetlight assemblies 100a 100b includes an aerially mounted node 102 arranged to capture video and process images of the roadway 108 in the video. In some embodiments, aerially mounted nodes 102 may be affixed or included in some, but not all, streetlight assemblies disposed along roadway 108. For example, in some embodiments, every other streetlight assembly, or some other number of the streetlight assemblies, may include aerially mounted nodes 102. In some embodiments, an aerially mounted node 102 affixed to a streetlight assembly may be utilized to acquire video and process images of objects on one side of a two-way street or along both sides of the street in the two-way street. In these or in other cases, aerially mounted nodes 102 of a first streetlight assembly 100a may cooperate with aerially mounted nodes 102 of a second streetlight assembly 100b to create one or more images in which to process information associated with certain objects of interest.

In the system for monitoring traffic 120 of FIG. 2, two vehicles (e.g., trucks) 114a, 114b are travelling on the roadway closest to the first and second streetlight assemblies 100a, 100b. These vehicles may include a first vehicle 114a and a second vehicle 114b. A pedestrian 116 is also shown crossing roadway via a crosswalk 112. In accordance with an embodiment, one or more aerially mounted nodes 102 acquire video and generate, capture, or otherwise sample images from the video to identify objects of interest and, in some cases, points of interest associated with the objects of interest.

Figure 3:
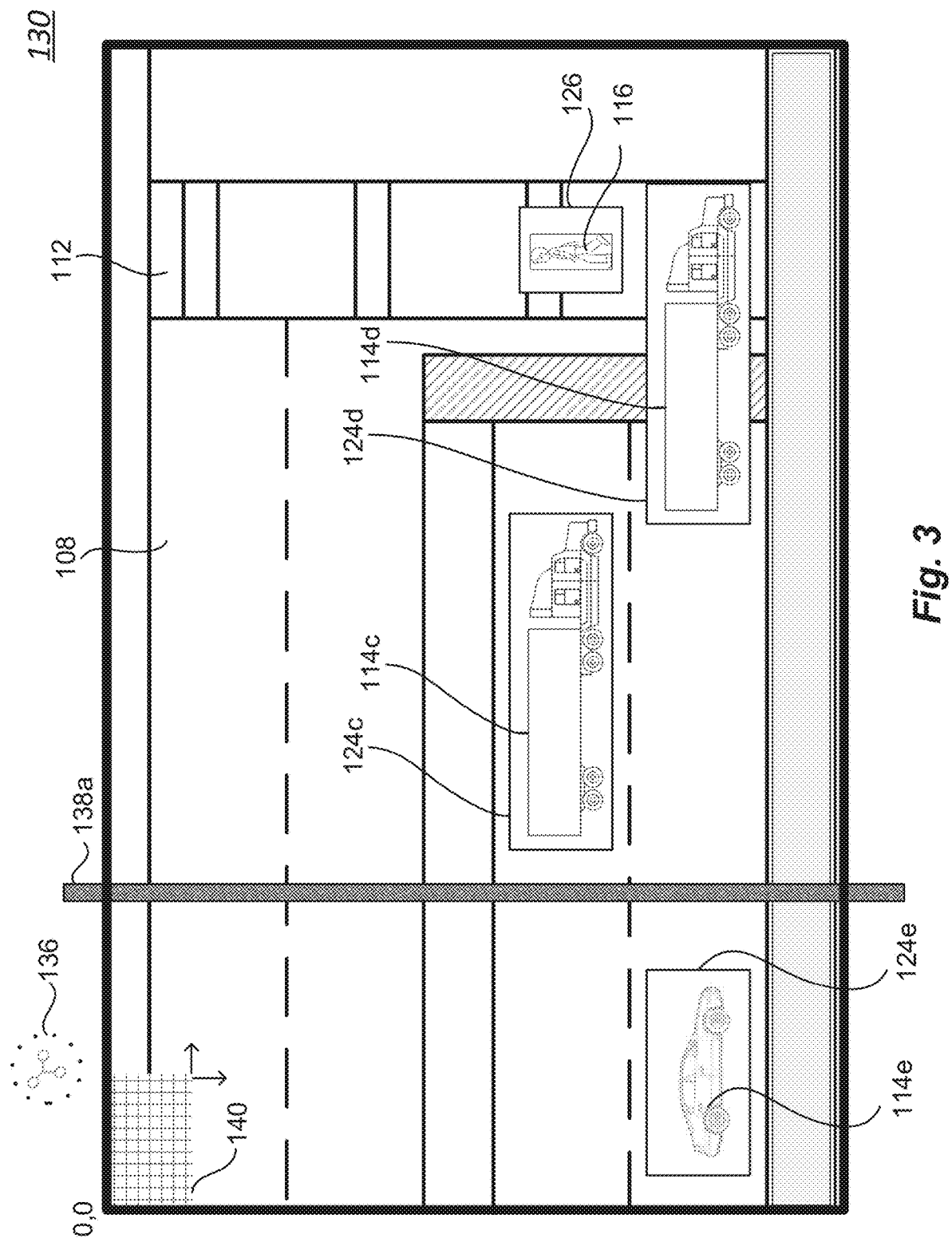
FIG. 3 is an embodiment of an image captured from video acquired by an aerially mounted node affixed to a streetlight assembly.

FIG. 3 is an embodiment of an image 130 captured from video acquired by a video camera of an aerially mounted node affixed to a streetlight assembly. The image 130 was generated, captured, or otherwise facilitated by an aerially mounted node affixed to a streetlight assembly disposed along a roadway 108. In some cases, multiple images along the lines of image 130 are be captured and processed.

Roadway 108 of FIG. 3 may be the same or a different portion of the roadway 108 of FIG. 2. The aerially mounted node, or a remote computing device, is arranged to identify one or more objects of interest within the captured image 130.

In the image 130 of FIG. 3, four different objects of interest are identified. These four objects include a first vehicle 114c (i.e., truck), a second vehicle 114d (i.e., truck), a third vehicle 114e (i.e., car), and a pedestrian 116. Each of the objects may be identified in a series of successive captured images from a video, and in some cases, image 130 may be one of the successive images of the video stream. In other cases, image 130 may be a composite or otherwise generated image from one or more video sources. By processing a series of successively captured images, for example, a speed or velocity of an object of interest may be estimated, and a trajectory of future position of the object may be predicted. For example, if a mapping between geocoordinates or grid points of a grid and pixels of a captured image is known or is otherwise determined, a speed at which an object is traveling along roadway 108 may be estimated.

A bounding perimeter may be calculated or determined for each of the objects of interest. In the present disclosure, a bounding perimeter is a geometrically or differently shaped virtual object that partially or completely surrounds or envelops an object of interest. In image 130 of FIG. 3, the first vehicle 114c may be associated with a first bounding perimeter 124c, the second vehicle 114d may be associated with a second bounding perimeter 124d, the third vehicle 114e may be associated with a third bounding perimeter 124e, and the pedestrian 116 may be associated with a fourth bounding perimeter 126. A two-dimensional pixel coordinate system 140 may be used to analyze individual pixels of image 130. A global positioning system (GPS) geocoordinate system 136 may be used to define anchor points in image 130, which may include any suitable structures determined in the image.

In accordance with at least one embodiment, geocoordinates of a certain geocoordinate system 136 for each object of interest and each of said objects' associated bounding perimeter may be determined by a neural network implemented by one or more processors of a an aerially mounted node or any suitable local or remote computing devices associated with one or more aerially mounted nodes. For example, metadata may be determined that indicates the geocoordinates of the bounding perimeters and may be transmitted to a remote computing device such as a backend server for further processing. In accordance with one or more embodiments, the remote computing device may receive, analyze, translate, or otherwise process the received geocoordinates for a bounding perimeter for an object of interest. In some embodiments, the remote computing device may estimate an approximate center point for an object of interest based on geocoordinates received for a bounding perimeter for the object of interest. In other embodiments, processing in the aerially mounted node or some other computing device, such as a neural network thereof, may estimate the approximate center point of the object of interest and subsequently transmit geocoordinates of the approximate center point of the object of interest to the remote computing device for further processing.

In accordance with an embodiment, an aerially mounted node or some other computing device, such as a remote computing device, may process retrieve or otherwise acquire or process geocoordinates for each object of interest in time stamped metadata associated with a series of images. In these or other cases, the metadata of one or more images may include time stamp information, location information, an aerially mounted node identifier, and still other information. For example, if images are captured for a certain period of time (e.g., 15 minutes, 2 hours, 10 hours, 24 hours, or some other longer or shorter period of time), there may be sufficient information from which to determine an optimal location to place a virtual tripwire in a set of grid points corresponding to a field of view of a video camera that generated image 130. Image 130 of FIG. 3 shows placement of a virtual tripwire 138a at an automatically generated location. For example, the placement of the virtual tripwire 138a may be determined based on various analytics determined from geocoordinate data received by an aerially mounted node or some other computing device, such as a remote computing device, from a particular video camera associated with a particular aerially mounted node.

In more detail, received geocoordinate data for objects of interest may be processed at an aerially mounted node or some other computing device, such as a remote computing device, to identify direction of travel for various objects of interest represented by grid points of a grid associated with geocoordinates. For example, each pixel or a grouping of adjacent pixels in an image 130 captured by a video camera associated with a particular aerially mounted node may correspond to one or more particular real-world geocoordinates or a grid point of a grid of geocoordinates. In other words, a mapping may be determined between each pixel or a grouping of pixels of an image 130 and a grid point of a grid.

In at least one exemplary embodiment, locations of the center point of an object of interest within a series of captured images may be correlated with grid points of a grid. For example, for each captured image, geocoordinates corresponding to the center point of one or more objects of interest may be identified, and a grid point or grid points corresponding to these geocoordinates may be determined. If an object of interest is in motion through a series of images, geocoordinates of the approximate center point of the object of interest will be represented by motion that appears to move across the grid to different grid points at points in time associated with the series of images. The represented movement of these grid points for the object of interest may be utilized to determine certain vector information for the object of interest. In some cases, for example, a direction of travel of the object of interest may be identified based on the movement of the determined approximate center point, or some other points or point information, of the object of interest at different points in time.

Figure 4A:
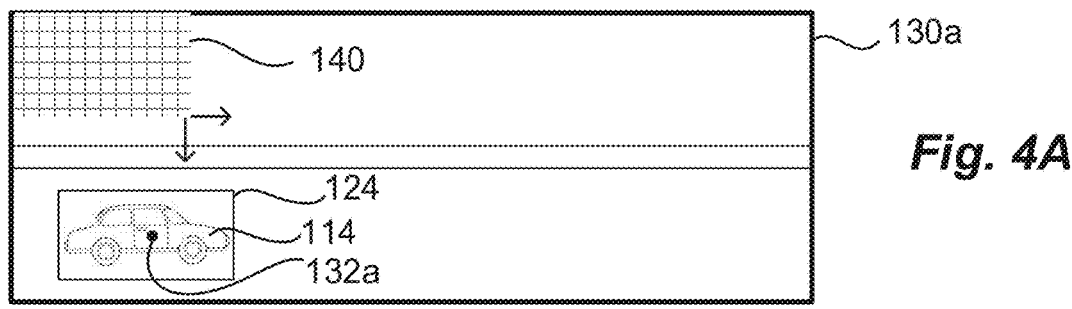
FIGS. 4A-4C are images showing movement of an object of interest along a roadway.
Figure 4B:
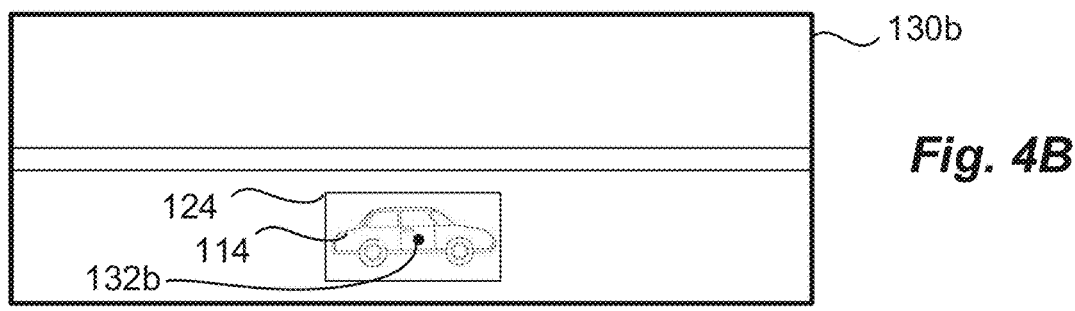
Figure 4C:
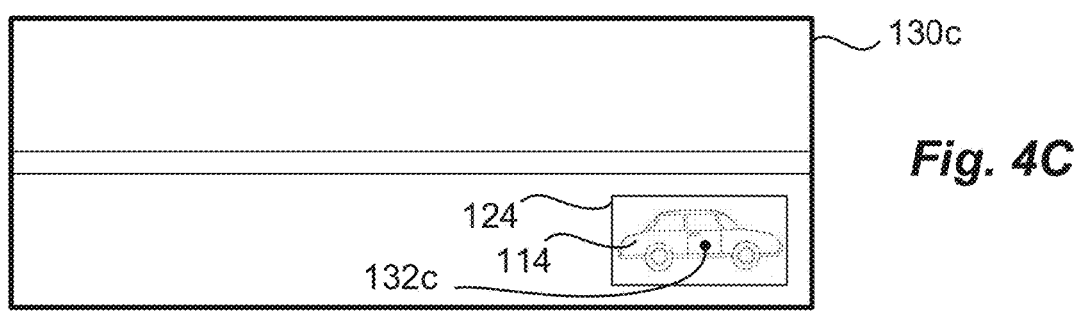
Figure 4D:
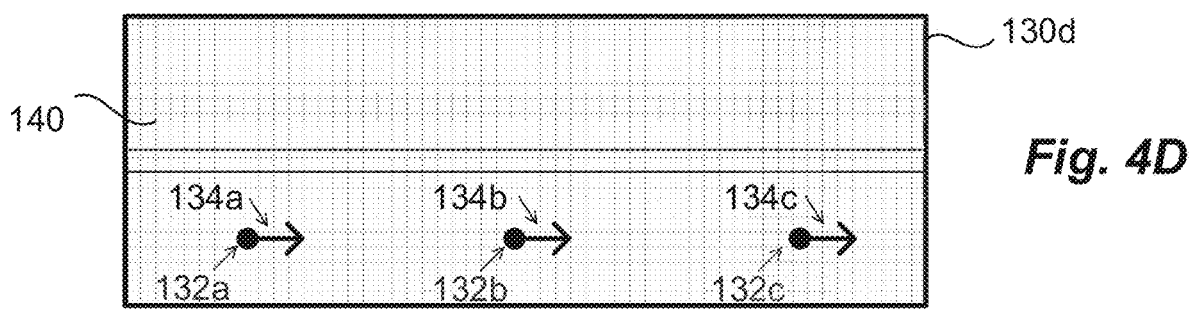
FIG. 4D is a set of information-bearing grid vectors on a generated image of the roadway representing locations of the approximate center point of the object of interest of FIGS. 4A-4C.

FIGS. 4A-4C are images 130a-130c showing movement of an object of interest 114 (e.g., a moving vehicle) along a roadway. FIG. 4D is a set of information-bearing grid vectors on a generated image 130d of the roadway representing locations of the approximate center point of the object of interest of FIGS. 4A-4C. The images 130a-130c may be generated by a video camera apparatus of one or more aerially mounted nodes 102. The generated image 130d may be generated by one or more processors of one or more aerially mounted nodes 102 or a remote computing device. In the present disclosure, FIGS. 4A-4D may be collectively referred to as FIG. 4. Structures earlier identified are not repeated for brevity.

In the image of FIG. 4A, the object of interest 114, such as an automobile, is travelling along the roadway at a particular time. The time may be represented by a time stamp, such as time t1. A bounding perimeter 124 surrounds the object of interest 114.

An approximate center point 132a may be determined for the object of interest 114 at time t1 in image 130a. In some cases, the approximate center point 132a may be generated mathematically from a determined length and width of the object. In some cases, the approximate center point 132a may be generated as an approximate geometric center of a group of pixels. In these or still other cases, the approximate center point 132a may generated in other ways. In at least some cases, the approximate center point 132a is determined algorithmically such as by an artificial intelligence algorithm (e.g., machine learning, machine vision, neural network, and the like) recognizing the object of interest and providing metadata about the object such as the approximate center point.

In the image 130b of FIG. 4B, the same object of interest 114 and bounding perimeter 124 are captured, generated, or determined, as the case may be. However, image 130b is associated with a different time stamp, such as t2. Here, the object of interest 124 may have travelled along the roadway such that the approximate center point 132b of the object of interest 114 at time t2 is in a different location than it was in image 130a at time t1.

Correspondingly, in the image 130c of FIG. 4C, the same object of interest 114 and bounding perimeter 124 are represented. However, image 130c is associated with a yet different time stamp, such as t3. In image 130c, the object of interest 114 has continued travelling along the roadway such that the approximate center point 132c of the object of interest 114 at time t3 is in a third different location than it was in image 130a at time t1 or in image 130b at time t2.

Movement of the approximate center points 132a, 132b, 132c of the object of interest 114 through the series of images 130a, 130b, 130c may be utilized to determine a direction of travel for the object of interest 114. For brevity, the approximate center points 132a-132c may be individually or collectively referred to as approximate center point 132. In at least one particular embodiment, geocoordinates associated with the location or locations of the approximate center point 132 of the object of interest 114 and the associated direction of travel may be plotted on a set of grid points such as a two-dimensional pixel coordinate system 140. In such cases, for example, each pixel or a grouping of adjacent pixels of an image captured by a video camera may correspond to particular geocoordinates and a grid point on a grid.

FIG. 4D illustrates a generated image 130d, which shows grid points for the locations of the approximate center points 132a-132c of the object of interest 114 at times t1, t2, and 63, respectively, according to an embodiment. Approximate center points 132a, 132b, 132c are shown on a grid, and corresponding vectors 134a, 134b, 134c, respectively, indicating directions of travel of the object of interest 114 are also determined. As shown, approximate center point 132a is associated with vector 134a indicating an approximate direction of travel of object of interest 114 at time t1. Approximate center point 132b is associated with vector 134b indicating an approximate direction of travel of object of interest 114 at time t2. Approximate center point 132c is associated with vector 134c indicating an approximate direction of travel of object of interest 114 at time t3.

Only three images and corresponding approximate center points 132a-132c of an object of interest 114 are depicted in the embodiment of FIGS. 4A-4C for the sake of simplicity. In other contemplated embodiments, however, dozens, hundreds, thousands, millions, and more approximate center points are identified, generated, or otherwise determined for objects of interest in images captured by one or more video cameras over a particular length of time. Additionally, in some cases, vectors indicating a direction of travel 134a, 134b, 134c may be determined for each of these approximate center points and applied to a virtual grid or other organizational structure, such the two-dimensional pixel coordinate system 140 shown in FIG. 4D. When movement of a sufficient number of objects of interest have been identified over time, the results may be applied to a coordinate system such as a grid, and the results may be further utilized to identify one or more optimal or preferred locations for a virtual tripwire.

FIG. 5 is another set of information-bearing grid vectors 142 on a generated image of another roadway representing directions of travel and associated variance for various object of interest. The embodiment of FIG. 5 illustrates directions of travel and associated variance for various points on a grid. The roadway of FIG. 5 is generally aligned with north-south travel lane and east-west travel lanes as indicated by a compass rose 144. In some cases, the compass rose 144 is not present, and instead, longitude and latitude coordinates or some other mechanism for understanding and processing directions of travel is provided.

The embodiment of FIG. 5 includes a set of information bearing vectors arranged on a set of grid points corresponding to a field of view of a video camera, such as a video camera of an aerially mounted node 102. A plurality of approximate center points and direction-of-travel vectors are shown in embodiment 142, each of which may be associated with a variance. For example, each point (i.e., each approximate center point of an object of interest) may be represented by a circle or dot. Each point may further be associated with a vector indicating a median direction of travel and a variance in the direction of travel. For example, various arrows are shown which indicate a vector showing direction of travel. As illustrated, some points have an arrow pointing toward the left of the image, such as indicative of a direction of travel from the East to the West. Some other points have an arrowing pointing toward the bottom of the image, such as indicative of a direction of travel from the North to the South.

A reference indicator is further represented in each one of the set of information-bearing grid vectors 142 of FIG. 5. A minus sign ("−"), for example, within one of the points may indicate that the point is associated with a relatively low variance in direction of travel; whereas, as a cross (or "x"), for example, through one of the points is associated with a relatively high variance in direction of travel. In the embodiment of FIG. 5, points located at or near an intersection may be associated with a relatively high variance in direction of travel, whereas points located relatively far from the intersection may be associated with a relatively low variance in direction of travel. The generated image represented in FIG. 5 as set of information-bearing grid vectors 142 may be of assistance to traffic engineers, roadway planners, and others. Accordingly, in some cases, any suitable number of generated images may be formed, overlaid, displayed, or otherwise implemented. In these and other cases, each approximate point is represented virtually, for example in a database, a file, a memory, or some other repository. In this way, in addition to a vector illustrating a media direction of travel and an indicator representing a degree of variance in the direction of travel, other suitable metadata may also be associated with one or more approximate center points. A non-limiting, non-exhaustive list of such metadata may include time stamp information, identification information regarding the camera, identification information regarding the object of interest, weather or other environmental information timely collected concurrent to the image, and the like. Other metadata is also contemplated.

The set of points showing in FIG. 5 are depicted as being relatively large for the sake of simplicity. It should be appreciated, however, that in some embodiments, any suitable number of points may be utilized (e.g., dozens, hundreds, thousands, millions), and for this reason, other generated images may render points in a different way, for example, a way which is relatively smaller.

Figure 6:
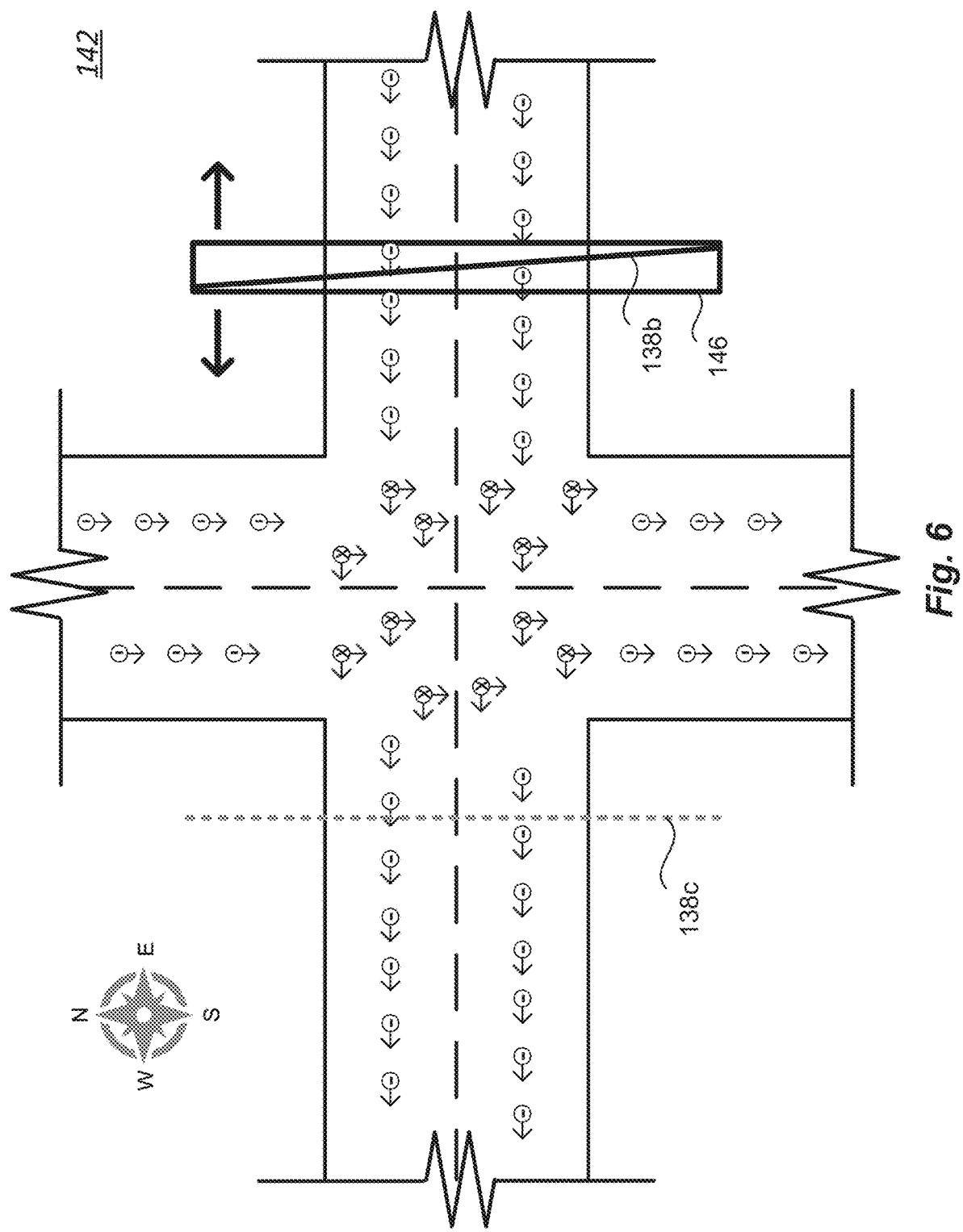
FIG. 6 is the set of information-bearing grid vectors of FIG. 5 and an automatically generated and placed virtual tripwire.

Variance in direction of travel and/or vectors showing direction of travel may be utilized to determine where to place a virtual tripwire. For example, as illustrated in FIG. 6, an automatically generated and placed virtual tripwire 138b has been overlaid on top of the information-bearing grid vectors 142 of FIG. 5. FIG. 6 illustrates an embodiment showing directions of travel and associated variance for various points on a two-dimensional pixel coordinate system 140 (e.g., a grid). In this exemplary embodiment, a sliding window 146 may be utilized to determine where to place a virtual tripwire 138b. For example, the sliding window 146 may be moved across a grid, and data associated with one or more points that are overlapping the sliding window 146 may be processed to judge various candidate locations for placement of virtual tripwire 138b. In some embodiments, sliding window 146 automatically slides across a grid, such as in a direction of travel along a roadway, for example. Such "sliding" of the sliding window 146 is performed computationally, and the generated image may be updated to demonstrate such motion. In the embodiment of FIG. 6, left and right arrows (not identified) illustrate the motion of the sliding window 146.

In one example, a goal is to count vehicles crossing the virtual tripwire 138b and determine average speed or velocity of each vehicle. In this case, it may be preferable for the virtual tripwire 138b to be formed at a determined geographic location where the sliding window 146 overlaps points associated with a relatively low variance in direction of travel. For example, the sliding window 146 may be "moved" virtually across a set of grid points until the sliding window 146 or virtual tripwire 138b overlaps with points having the smallest level of variance in direction of travel in the generated image.

On the other hand, if a goal is to count vehicles changing direction, such as at the intersection between the North-South roadway and the East-West roadway, it may be preferable to locate virtual tripwire 138b at a point where the sliding window 146 overlaps points associated with a relatively high variance in direction of travel. In such an example, sliding window 146 may be computationally, virtually, or otherwise moved across a set of grid points until the sliding window 146 or virtual tripwire 138b overlaps with points having the highest level of variance in the direction of travel.

Once a location has been identified that is associated with the sliding widow 146 overlapping points with preferred levels or values of the variance of direction of travel, the virtual tripwire 138b may be placed at a location within the sliding window 146.

In some cases, the virtual tripwire 138b is placed at either a predetermined location or a predetermined position within the sliding window 146. In other cases, an optimal placement of the virtual tripwire 138b within the sliding window 605 may be further selected via manual adjustment or some other mechanism that permits a higher level of accuracy.

Information corresponding to the location of an optimal placement for a virtual tripwire 138b may subsequently be logged or otherwise stored for further processing.

An optional second virtual tripwire 138c is also represented in FIG. 6. The location of the second virtual tripwire 138c, when implemented, is located using a sliding window in a same or similar fashion as described with respect to virtual tripwire 138b. The second virtual tripwire 138c will generally be formed with different parameters and arranged to provide different information from the first virtual tripwire 138b. Accordingly, the optimal location for the first virtual tripwire 138b will different from the optimal location for the second virtual tripwire 138c. Along these lines, any suitable number of virtual tripwires, along with an optimal location for each, may be formed in accordance with the teaching of the present disclosure.

Figure 7:
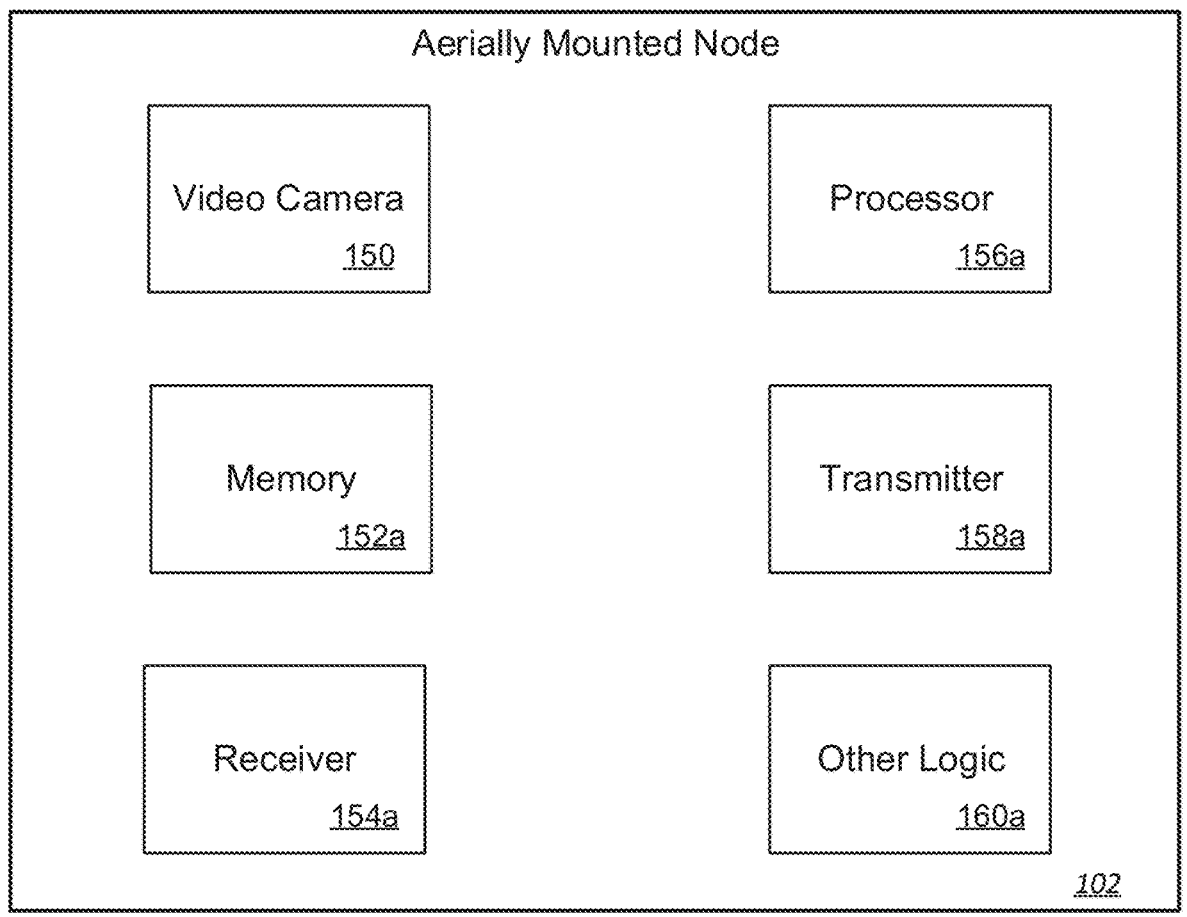
FIG. 7 is an embodiment of an aerially mounted node arranged to automatically generate a place a virtual tripwire.

FIG. 7 is an embodiment of an aerially mounted node 102 arranged to automatically generate a place a virtual tripwire. The aerially mounted node 102 of FIG. 7 may be arranged as a standalone video processing device with local on-board computing resources in some embodiments, and in other embodiments, the aerially mounted node 102 may communicate with one or more remote computing servers. The aerially mounted node 102 may be disposed on, or otherwise in proximity to, a streetlight assembly located along a roadway 108 as in FIG. 2.

Aerially mounted nodes 102 may include various components such as a video camera 150, memory 152a, a receiver 154a, a processor 156a, a transmitter 158a, and other logic 160a. Video camera 150 is a video capture device arranged to capture video of, for example, traffic and other objects of interest along a roadway 108. Processor 156a may sample or capture one or more images, such as a series of images, from the video. Processor 156a, alone or with one or more other local or remote computing devices, may also identify one or more objects of interest in one or more of the captured images and may also identify geocoordinates for perimeter boundaries associated with the one or more objects of interest. Processor 156a may generate metadata that indicates the geocoordinates of the perimeter boundaries and may store such information in memory 152a. Memory 152a may additionally or alternatively include computer-executable instructions which are executable by processor 156a to perform one or more processes, such as to identify the perimeter boundaries, generate sliding windows 146, move sliding windows, determine one or more suitable location for a virtual tripwire 138b, and the like. Transmitter 158a may transmit one or more messages, such as a message comprising metadata indicating geocoordinates of perimeter boundaries or other information. For example, transmitter 158a may transmit such a message to a server for subsequent processing. Receiver 154a may receive one or more messages originating from the remote computing server or from some other device. In at least some cases, receiver 154a and transmitter 158a are combined into a single transceiver device.

In accordance with an embodiment, aerially mounted node 102 may obtain a series images of at least a portion of a roadway, may process the images to identify objects of interest, may determine respective bounding perimeters for each of the objects of interest in one or more of the images of the series, and may determine an approximate center point for each of the objects of interest along with a position of such center point at various times (e.g., t1, t2, to corresponding to time stamps in a series of images). In some cases, a respective bounding perimeter is formed as a virtual geometric object surrounding a respective one of the two or more objects of interest within a geometric plane of at least one of the images. Transmitter 158a may transmit a message comprising geocoordinates for the respective bounding perimeters, approximate center points, or any other selected data or metadata associated with the objects of interest in the at least one of the images to a remote computing device for further processing, for example.

Embodiments of the aerially mounted node 102 include other logic 160a that may include any suitable circuitry, executable software, data, and other logic. In some cases, for example, the other logic 160a includes positioning circuitry (e.g., a global positioning system (GPS) that provides a location of the node (e.g., longitude, latitude, altitude, and the like) within a geographical coordinate system. In some cases, the other logic 160a includes identification logic to uniquely identify each aerially mounted node 102 within a system of aerially mounted nodes 102. In these and other cases, the other logic 160a may include security logic to remove, anonymize, obfuscate, aggregate, or otherwise process personally identifiable information (PII) from any images captured by the video camera 150. Such security logic may alternatively or additionally encrypt or otherwise protect the PII and other data of the node and perform certain other security functions.

Figure 8:
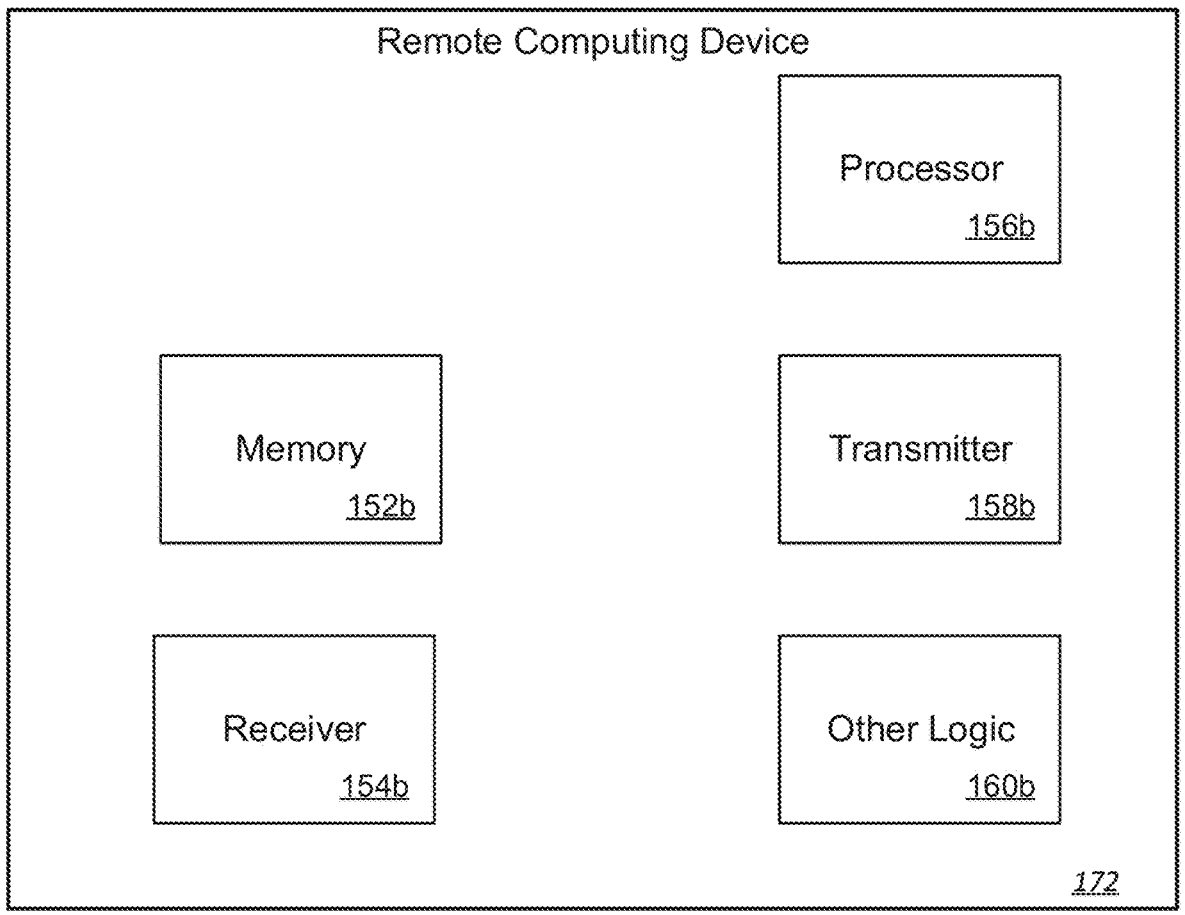
FIG. 8 is an embodiment of a remote computing device.

FIG. 8 is an embodiment of a remote computing device 172, which may comprise a computing server, for example. Remote computing device 172 may be a standalone device or a network of computing devices (e.g., a cloud computing system, a server farm, or the like). In this way, the remote computing device 172 may be a standalone computing device having a single set of computing resources, or the remote computing device 172 may include any suitable number of remote computing devices.

Remote computing device 172 includes various components such as a memory 152b, a receiver 154b, a processor 156b, a transmitter 158b, and other logic 160b. Receiver 144b of the remote computing device 172 may receive a single message or a plurality of messages from an aerially mounted node 102. In some cases, the messages include one or more images (i.e., a single image or a stream of images) from one or more aerially mounted nodes 102. In these or other cases, the messages include geocoordinates for perimeter boundaries of one or more objects of interest in a series of images, for example. In some cases, this information is included in metadata in the received message. Other messages are of course contemplated.

In some cases, processor 156b may be arranged to process the first, second, and third images 130a-130c of FIGS. 4A-4C, and in some cases, processor 156b may be arranged to generate image 130d of FIG. 4D. Along these lines, processor 156b may additionally or alternatively process image data to produce the set of information-bearing grid vectors 142 of FIGS. 5-6. Processor 156b in some cases may be arranged to identify a suitable location at which to place a virtual tripwire 138b on a grid, for example, such as via use of a sliding window 146 as discussed herein with respect to FIG. 6.

Memory 152b may additionally or alternatively be arranged to include computer-executable instructions which are executable by processor 156b. One or more processes performed by processor 156b may identify a location for a virtual tripwire, and in some cases, one or more processes determine approximate center points of objects of interest.

Transmitter 158b may transmit one or more messages, such as a message to a video processing device, which indicates a location, as via geocoordinates and/or grid points, for a virtual tripwire. Transmitter 158b may also transmit an alert based on the identification of a location for a virtual tripwire, for example.

Embodiments of the remote computing device 172 include other logic 160b that may include any suitable circuitry, executable software, data, and other logic. In some cases, for example, the other logic 160a includes, but is not limited to, web server functionality, database functionality, security logic (e.g., hardware, software, or hardware and software arranged to perform encryption/decryption, obfuscation, or other data protection operations), parallel processing, one or more user interfaces, and one or more machine interfaces.

One of skill in the art will recognize that features of the other logic 160a described with respect to an aerially mounted node 102 may also be implemented in the other logic 160b of a remote computing device 172, and vice versa.

In some cases, the other logic 160a of an aerially mounted node 102 (FIG. 7) and/or the other logic 160b of a remote computing device 172 may perform geostatistical calculations to predict a position of an object of interest, a direction of travel of an object of interest, a likelihood of changing such direction, a variance, or other like predictive information. Such geostatistical calculations may also be applied to identify an optimal location of a virtual tripwire. A user may select sizes, shapes, length, width, time of active data collection, and other parameters associated with a virtual tripwire. Some or all of the information is applied as described herein to generate the optional location of the virtual tripwire.

Geostatistical calculations, as the term is used herein, may include Gaussian process regression (e.g., kriging algorithms), simple interpolation, spatiotemporal averaging, modeling, and many other techniques. In some embodiments, certain techniques are used to create one type of predictive condition (e.g., a likelihood of changing direction, a likelihood of speeding up or slowing down, a likelihood of a first object of interest passing (i.e., overtaking) a second object of interest, and the like), and in other embodiments, different techniques are used to create other types of predictive conditions. For example, in areas of heavy traffic or in roadways with dense intersections, spatiotemporal averaging techniques may influence the calculations of predictive positioning, predictive direction of travel, and predictive variances. In areas where images are updated slowly, or where actual data is otherwise limited or too old, kriging techniques may be relied on more heavily to produce a predictive information. In still other cases, where aperiodic events take place (e.g., a funeral procession, construction, storms or inclement weather, a popular concert or sporting event, etc.), data mining and modeling techniques may be used to produce predictive information associated with one or more objects of interest.

In at least some cases, kriging algorithms perform spatial interpolation by applying weighting factors based on the calculated distance between geographic points where anchor points or danger zone boundary data has been collected. The kriging techniques model the correlation structures of the data parsed from images as a function of distance and may include information about any known covariance between the predicted separation or lack of separation between objects of interest and other spatial information (co-kriging).

In embodiments contemplated in the present disclosure, kriging algorithms provide a prediction of a quantitative measure (e.g., how many predicted changes of direction will actually occur). If a particular mapped grid includes few or no actual objects of interest, or if the images showing such objects are captured at times in the recent past (i.e., the data is not "stale"), then predictive lane changes, turns, and the like having an acceptable accuracy can be made about the likelihood of a change in direction, change in speed, and the like. The predictions, which can be derived from spatiotemporal models of the correlation structure of training data captured over many similar roadway locations (e.g., kriging or co-kriging in the case of purely spatial interpolation), provide a consistent, quantifiable, process for data interpolation. Hence, the interpolation algorithms described herein bring analysis-based estimation to dangerous condition predictions and thereby enable useful data on which automatic determination of a virtual tripwire placement can be performed.

The spatiotemporal averaging techniques described herein include averaging a set of data drawn from a plurality of images collected over geographic space and/or over time. The averaged data can be used in the determination of predictive conditions. When such data is drawn from images of actual roadway conditions, the data is recognized as being accurate to the geographic location at the time the data is collected.

In some embodiments, data is collected and spatially averaged within a region such as a grid segment of M by N (M×N) pixels, where M and N are integers representing a count of pixels and where M and N further represent a "length" and "width" of pixels in the particular image. In other embodiments, data is collected and spatially averaged across several regions. The spatial averaging may include simple averaging, wherein a sum of values is divided by the number of samples, weighted averaging, or some other averaging techniques. In one case of behavior of an object of interest, using weighted data averaging, data parsed from pixels in one region of one image is fully weighted, data parsed from immediately adjacent pixel regions is partially weighted at a first level, and data parsed from nearby, non-adjacent pixel regions is partially weighted at a second level, lower than the first level. The weighted data samples may be summed in the embodiment, and the sum may be divided by the number of samples.

In some embodiments, pixel data representing bounding perimeters, virtual tripwire placement, and/or the actual object of interest may be collected and temporally averaged. It is recognized that based on some conditions (e.g., midday versus rush hour; daylight versus twilight or nighttime; winter versus summer; and other such cases), certain data may become less relevant to the calculation of predictive lane changes, turns, and the like. Accordingly, techniques can be employed to reduce the influence of certain data as the data ages. For example, a weighting factor may be applied to certain image data to change (e.g., increase or reduce) its influence by "X" percent (e.g., five percent, 10 percent, 25 percent, or some other weight) per hour for a determined number of hours, by "X" percent per month, by "X" percent based on a size or speed of the object of interest, or for any other condition. The weighting factor may subsequently be reduced further as the conditions change, and the rate of increase or reduction of the weighting factor can be also changed. For example, it has been recognized in some embodiments that more lane changes occur during rush hour, but not during the middle of the day. Accordingly, in the embodiment, the predictive data can be fully weighted during rush hour, and subsequently, every hour thereafter, the weighting of the predictive data can be reduced by some amount until the weighting reaches a desired level. In this way, the weighted data of certain times of the day may have little or no influence on predictive calculations for lane changes, turns, and the like, and the weighted data at other times may have disproportionately more influence. Such time-based object of interest behavior conditions may permit improved automatic selection of a virtual tripwire location.

Other techniques applied to generate various object of interest behavior data include data mining techniques. Data mining techniques may be categorized as classification algorithms and/or regression algorithms. These types of classification and regression techniques may be executed as tree-based algorithms (e.g., Classification and Regression Tree (CART) techniques). Using CART techniques, analysis in a given aerially mounted node 102 or remote computing device 172 may apply progressive or recursive sequences of binary (e.g., if-then) decisions. In at least some cases CART techniques are performed to prepare data drawn from multiple images for use within the kriging algorithms. These classification techniques process data iteratively to continuously, over a determined period of time, predict categorical variables, and the regression techniques process data iteratively to predict continuous variables. Techniques contemplated herein may include "bagging" techniques, "random forest," techniques, and others.

Exemplary CART techniques described in the present disclosure to produce object of interest behavior values are non-parametric and non-linear. Values resulting from tree-based classification and regression algorithms are derived from a handful (e.g., two, five, ten, twenty-five, or some other number) of logical if-then conditions (tree nodes). The algorithms do not require implicit assumptions about the underlying relationships between predictor variables and a dependent variable, and actual relationships are not necessarily linear. In one example of non-linearity, a continuous outcome variable (e.g., likelihood of two objects of interest both changing lanes simultaneously, speeding up, slowing, down, and the like) could be positively related to an incoming variable (e.g., relative speed between the two objects of interest, an observed third object of interest in proximity, and the like) if the incoming variable is less than some certain amount (e.g., 20 kilometers (km) per hour, 10 km/hour, or some other speed) in a selected region (e.g., grid segment) having a certain characteristic (e.g., an intersection with a crosswalk), but negatively related if the variable is the same under different characteristics or more than that amount (i.e., higher speed) under any characteristics. In this way, a tree algorithm may also reveal two or more splits based on a value of a single incoming variable, which can serve to illuminate a non-linear relationship between the variables.

Still other techniques can be used to generate values representing lane changes, turns, and any other object of interest behavior predictions. For example, techniques to improve model selection can be used to acquire more relevant data. In more detail, model selection techniques can be used to select or otherwise identify data in one set of roadway characteristics that is similar in other roadways. By improving model selection techniques, the "over-fitting" of models can be avoided, for example, predicting high likelihoods of turning proximate a detected pothole, predicting high speed during a Sunday afternoon near a sports stadium, and other such over-fitting.

Figure 9:
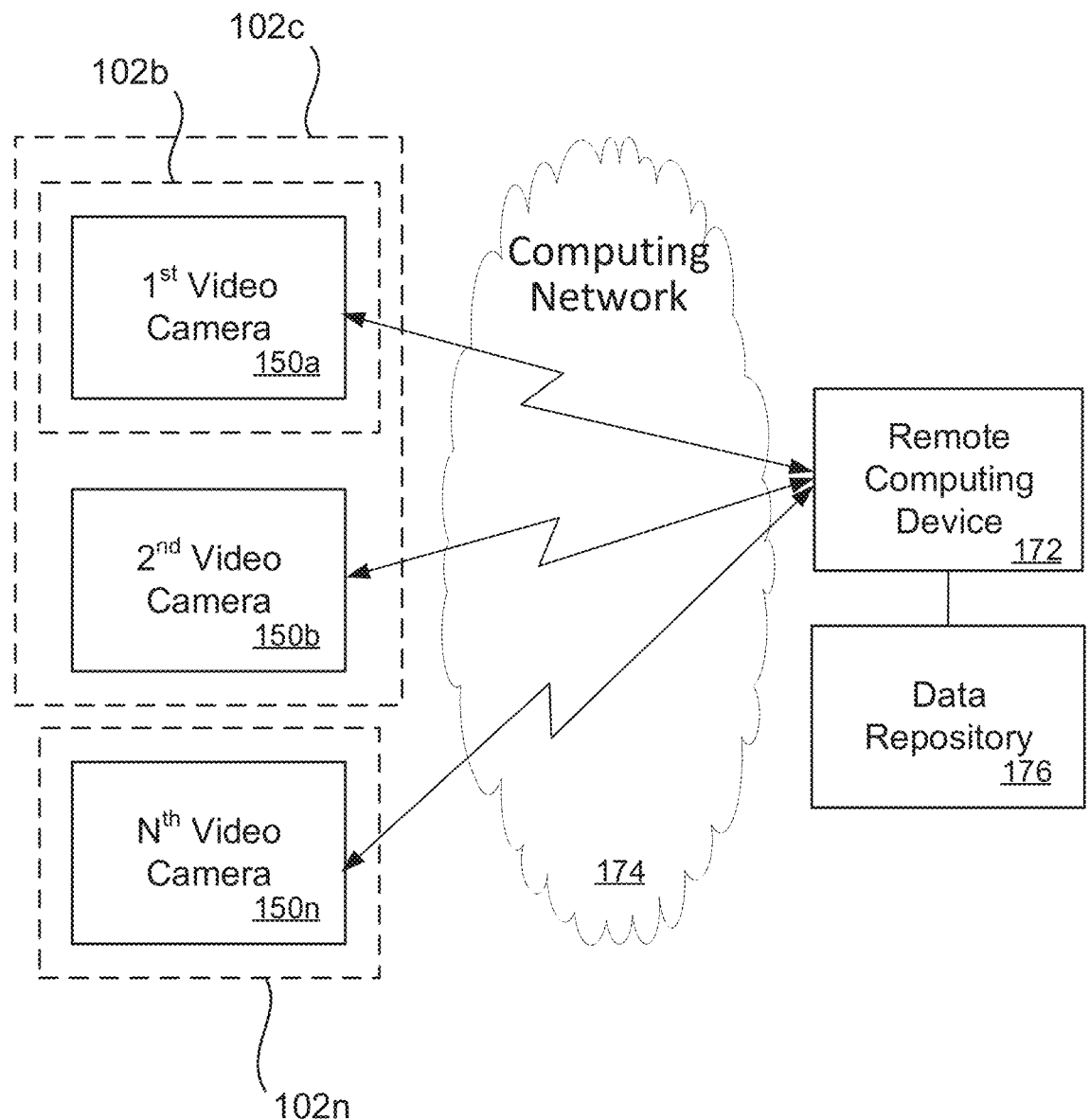
FIG. 9 is an embodiment of a system for aerially mounted nodes to communicate with a remote computing server.

FIG. 9 is an embodiment of a system 170 for aerially mounted nodes to communicate with a remote computing device 172. Various video camera devices, such as a first video camera device 150*a*, a second video camera device 150*b*, and an Nth video camera device 150*n*, may be integrated with, or otherwise associated with, various aerially mounted nodes 102*b*, 102*c*, 102*n*. The aerially mounted nodes 102*b*, 102*c*, 102*n* of FIG. 5 are along the lines of other aerially mounted nodes 102 of the present disclosure. In some cases, an aerially mounted node 102*c* may have a plurality of cameras associated therewith, and in other cases, an aerially mounted node 102*n* may have only a single video camera 150*n* associated therewith or even no video cameras.

Information from any of the video cameras 150*a*, 150*b*, 150*n* may be communicated toward the remote computing device 172, such as via one or more wired or wireless (e.g., fiber connections, cellular connections, and the like). For example, each of the aerially mounted nodes 102*b*, 102*c*, 102*n* and its associated video camera devices may be affixed to a streetlight assembly, such as the streetlight assembly 100 of FIG. 1.

Although only three video camera devices 150*a*, 150*b*, 150*n* are illustrated in FIG. 9, it should be appreciated that in some implementations, more or fewer than three video camera devices may be utilized. Each of the video camera devices may capture images from video and may process the images to determine geocoordinates for perimeter boundaries associated with objects of interest in the images. Each of the video camera devices 150*a*, 150*b*, 150*n* may also generate metadata that describes the geocoordinates for the approximate center point of the respective object of interest as well as other information identifying the objects of interest and/or the images from which these objects of interest were identified.

Aerially mounted nodes 102*b*, 102*c*, 102*n* may communicate metadata corresponding to perimeter boundaries in one or more images to remote computing device 172 via transmission over a network 174 such as the Internet or a cellular network, for example. Remote computing device 172 may process or analyze the received metadata to identify an optimal location at which to place a virtual tripwire such as on a set grid points, for example. After a location for a virtual tripwire has been identified, information corresponding to the location may be stored in a repository such as within data storage device 176. Although only one remote computing device 172 is shown in system 170 of FIG. 9, it should be appreciated that in some implementations, a cloud-based network device of a set of remote computing server devices may be utilized, for example.

Figure 10:
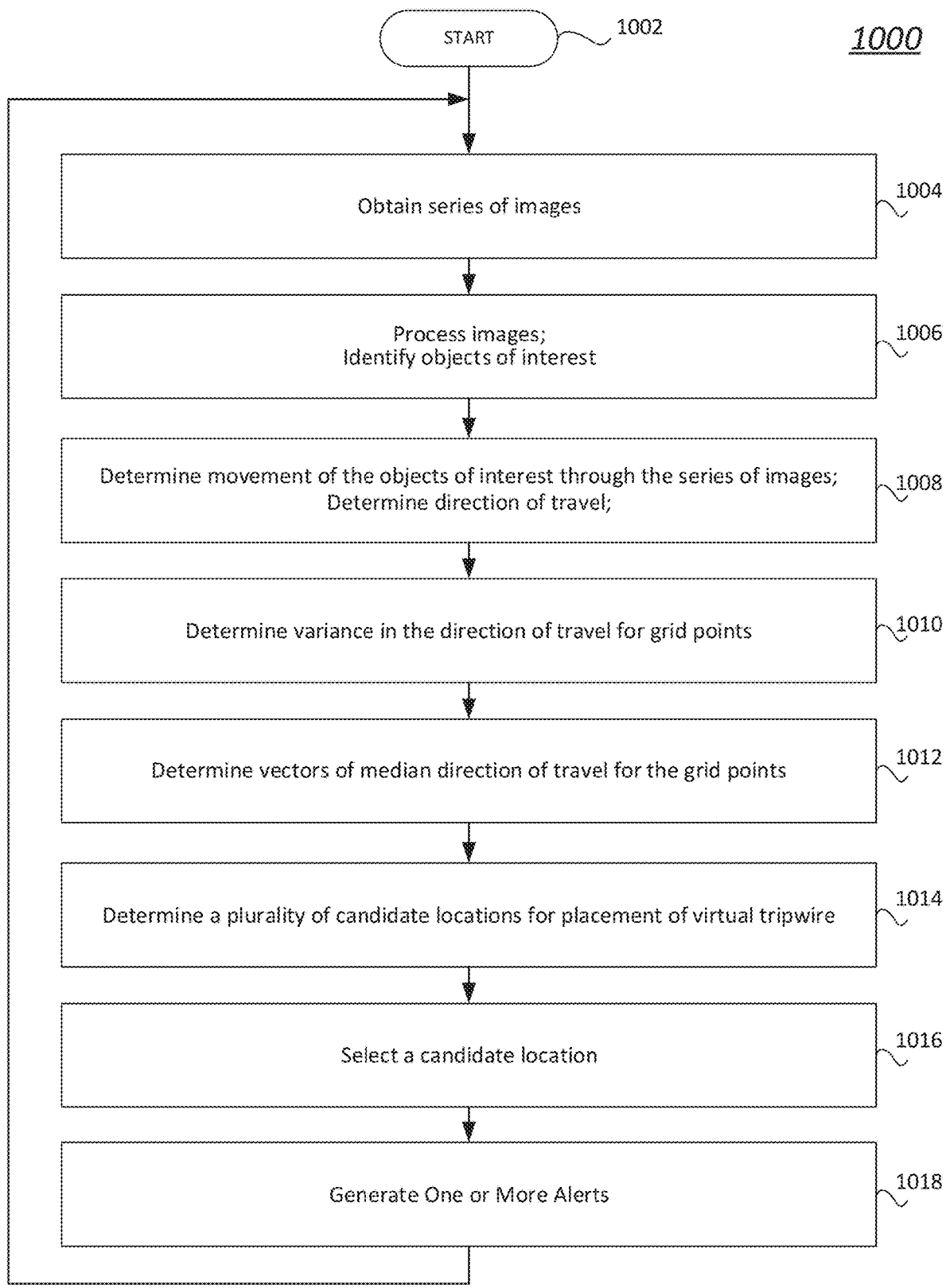
FIG. 10 is a data flow diagram representing a process to identify a location at which to place a virtual tripwire on a set of grid points corresponding to a field of view of a certain video camera.

FIG. 10 is a data flow diagram representing a process 1000 to identify a location at which to place a virtual tripwire on a set of grid points corresponding to a field of view of a video camera. Embodiments in accordance with claimed subject matter may include all of, less than, or more than modules 1002 through 1018. Also, the order of modules 1002 through 1018 is merely an example order. Processing begins at module 1002.

At module 1004, a series of images of at least a portion of a roadway within a field of view of a camera is obtained. For example, a set of grid points may correspond to a pixel or grouping of pixels of each image of the series of images.

At module 1006, the series of images may be processed to identify objects of interest.

At module 1008, movement of the objects of interest through the series of images may be determined, and a direction of travel of one or more points of each of the objects of interest through the set of grid points may be identified.

At module 1010, a variance of the direction of travel for the individual or group of grid points may be determined.

At module 1012, a plurality of vectors of median direction of travel may be determined for a plurality of vector points corresponding to the set of grid points.

At module 1014, a plurality of candidate locations for placement of a virtual tripwire on the set of grid points may be determined to monitor movement of the one or more objects of interest through the series of images. For example, the virtual tripwire may comprise a line segment extending in a direction approximately orthogonal to the direction of travel along the at least the portion of the roadway.

At module 1016, a particular candidate location may be selected, from the plurality of candidate locations, for the placement of the virtual tripwire perpendicular to direction of travel which intersects grid points. For example, the selection may be based on the plurality of vectors, and on the associated variance of the direction of travel.

At module 1018, an alert may be generated based on the selection of the particular candidate location for the placement of the virtual tripwire.

Processing for the process to identify the location at which to place the virtual tripwire is ongoing.

Having now set forth certain embodiments, further clarification of certain terms used herein may be helpful to providing a more complete understanding of that which is considered inventive in the present disclosure.

In the present disclosure, the words "optimal," "best," "ideal," "perfect," and the like, when used in the context of selecting a virtual tripwire location, are recognized as words of relation and not absolute supremacy. For example, in choosing between location "A" and location "B" for a virtual tripwire, location "A" may be determined "optimal" or "best," and such a determination is based on a consideration of certain factors that apply to both location "A" and location "B." It is recognized that one or more other locations (i.e., location "C," location "D," location "N," etc.) may provide improved results over location "A," yet in the context of the present disclosure, location "A" may still be determined to be optimal, best, ideal, superior, greatest, exceptional, excellent, outstanding, superlative, unsurpassed, matchless, incomparable, supreme, most, greatest, highest, or the like, even though location "A" may not be any of these things relative to another location or to many other locations. Stated differently, the present disclosure teaches systems, methods and devices to automatically determine an optimal virtual tripwire location (e.g., location "A") for any particular one or more reasons, factors, or sets of parameters, over other considered locations.

Generally, an "object of interest," as used herein, refers to an object whose position or positions determined over a certain passage of time (e.g., motion of the object, position of the object relative to other stationary objects or objects in motion, and the like) will be used in a determination of an optimal location for a virtual tripwire. For example, objects of interest may comprise a predefined object, such as a vehicle, a living entity (e.g., a human or animal), a stationary object (e.g., a streetlight pole, a control box, a fire hydrant, or some other permanently or temporarily unmoving object), or some other object (e.g., trash or other debris, traffic cones or other worksite materials, any other detectable or determinable object). At any given instance, one or more objects of interest may be imaged, analyzed, tracked, or otherwise processed. In some implementations, an object of interest may be identified based on relative motion of one or more objects of interest through a series of captured images. In some implementations, an object of interest may be identified based on its estimated size. For example, if a non-stationary object comprises a certain minimum number of adjacent pixels in a series of captured images, the object may be considered an object of interest.

Video, in the present disclosure, has been discussed with respect to two-dimensional video. This discussion is not limiting, and it is understood by those of skill in the art that other imaging and information-producing technologies may also be used. For example, three-dimensional video, other multi-dimensional video, "heat mapping" video, infrared, microwave, radar, LiDAR, and the like may also provide node-collected information for analysis in accordance with the principles of the present disclosure. Along these lines, a video camera (e.g., video cameras 150, 150*a*, 150*b*, 150*c* of FIGS. 4 and 9), as discussed in the present disclosure may be any device arranged to provide information such as an image or stream of images suitable for determining objects of interest, regions of interest (i.e., bounding perimeters), position relative to a virtual tripwire, and the like.

A bounding perimeter, in the present disclosure, has been discussed as a geometric object surrounding an object of interest within a geometric plane of the image. This discussion is not limiting, and it is understood by those of skill in the art that any suitable two-dimensional, three-dimensional, or otherwise multidimensional shape may be used as a region of interest, and such region of interest may be interchangeably understood as the bounding perimeter described herein. Exemplary bounding perimeters may be rectangular, square, circular, ovular, triangular, or hexagonal. Other exemplary bounding perimeters have an irregular shape. In some cases, a bounding perimeter tracks a shape of the object of interest by one or more predetermined distances. The region of interest defined by the bounding perimeter may substantially envelop the object of interest in some cases, but other cases, the region of interest (i.e., bounding perimeter) may only partially envelop an object of interest. For example, if a vehicle is moving forward in a certain direction, a region of interest (i.e., bounding perimeter) may in some cases be formed only around the front of the vehicle, or only around the front and sides of the vehicle, but not to the rear of the vehicle. In the computing environment context of the present disclosure, a bounding perimeter may be realized as a bounding perimeter virtual object located by reference to, or otherwise in accordance with, a determined geographical position.

Metadata, as the term is used herein, is "information" about "data." The "information" may be any suitable information and in any suitable form represented, or representable, in a computing device. The "data" may be any suitable data associated with detection of objects of interest and near-miss conditions of such objects. For example, and not for limitation, metadata may include geocoordinates, identifiers to objects of interest, addresses, time-of-day, day-of-week, day-of-year, sensor identifiers, camera identifiers, aerially mounted node identifiers, and any other such suitable information.

A roadway, as the term is used in the present disclosure, includes any surface where vehicles travel. The vehicles may be automobiles, cars, trucks, buses, vans, lorries, carts (e.g., golf carts, jitneys, and the like), motorcycles, bicycles, scooters, recreational vehicles, wagons, trailers, tractors, sleds, snowmobiles, construction equipment (e.g., loaders, bulldozers, steamrollers, and the like), trains, trolleys, trams, monorails, airplanes on the ground, and the like. The vehicles may be powered by a petroleum engine, electricity, a chemical reaction, or any other power source. The vehicles may be locally or remotely manually controlled, partially autonomous, or completely autonomous. The roadway may be formed of asphalt, concrete, gravel, steel, tile, wood, a composite material, hard-packed dirt, or any other surface suitable for vehicle travel. The roadway may be any pathway of any suitable length, width, or other dimension. The roadway may be outdoors, indoors, or partially outdoors and partially indoors. Exemplary roadways contemplated in the present disclosure include, but are not limited to, aisles, alleys, arterials, avenues, autobahns, bike lanes, boulevards, bridle paths, bridle ways, broadways, bypasses, by-ways, campuses, cart-tracks, causeways, circles, circuses, courses, crosswalks, cul-de-sacs, dead ends, tracks, drives, driveways, expressways, factories, freeway, garages, groves, highways, lanes, military bases, motorways, overpasses, parking lots, passages, paths, pathways, ramps, roads, routes, ring roads, service roads, shoulders, side roads, squares, stores, streets, terraces, thoroughfares, trails, tunnels, turnpikes, underpasses, warehouses, and the like.

In some cases of the present disclosure, embodiments are described where an aerially mounted node is positioned above, below, or otherwise proximate a luminaire (e.g., FIG. 1). In these and other cases, the aerially mounted node may be electromechanically coupled to a standardized powerline interface of the luminaire. The standardized powerline interface is roadway area lighting standard promoted by a standards body such as ANSI C136.41 (e.g., a NEMA-based connector/socket system), but other standardized powerline interfaces are contemplated (e.g., an interface compliant with the ZHAGA CONSORTIUM, which is an international association that creates industry standards in the LED lighting industry). In at least some of the cases of the present disclosure, the standardized powerline interface defines a limited number of electrical/communicative conduits over which signals may be passed in-to or out-from the streetlight luminaire. In some cases, the interface may be referred to as a NEMA interface, a NEMA socket, an ANSI C136 interface, or the like.

At least one known NEMA interface implements the powerline interface with connectors and receptacles that include seven electrical/communicative conduits (e.g., pins, blades, springs, connectors, receptacles, sockets, and other like "contacts"). A set of three primary contacts carry a Line voltage signal, a Load voltage signal, and Neutral voltage signal. A set of four secondary contacts may be used by the streetlight controller to pass power, control information, status information, and the like.

As will be appreciated based on the foregoing specification, one or more aspects of the above-described examples of the disclosure may be implemented using computer programming or engineering techniques including computer software, firmware, hardware or any combination or subset thereof. Any such resulting program, having computer-readable code, may be embodied or provided within one or more non-transitory computer readable media, thereby making a computer program product, i.e., an article of manufacture, according to the discussed examples of the disclosure. For example, the non-transitory computer-readable media may be, but is not limited to, a fixed drive, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

FIG. 10 includes a data flow diagram illustrating a non-limiting process that may be used by embodiments of aerially mounted nodes and other computing systems described in the present disclosure. In this regard, each described process may represent a module, segment, or portion of software code, which comprises one or more executable instructions for implementing the specified logical function(s). It should also be noted that in some implementations, the functions noted in the process may occur in a different order, may include additional functions, may occur concurrently, and/or may be omitted. Accordingly, the descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

Some portions of the detailed description are presented herein in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated.

The figures in the present disclosure illustrate portions of one or more non-limiting computing device embodiments such as one or more components of aerially mounted node 102. The computing devices may include operative hardware found in conventional computing device apparatuses such as one or more processors, volatile and non-volatile memory, serial and parallel input/output (I/O) circuitry compliant with various standards and protocols, wired and/or wireless networking circuitry (e.g., a communications transceiver), one or more user interface (UI) modules, logic, and other electronic circuitry.

Processing devices, or "processors," as described herein, include central processing units (CPU's), microcontrollers (MCU), digital signal processors (DSP), application specific integrated circuits (ASIC), peripheral interface controllers (PIC), state machines, and the like. Accordingly, a processor as described herein includes any device, system, or part thereof that controls at least one operation, and such a device may be implemented in hardware, firmware, or software, or some combination of at least two of the same. The functionality associated with any particular processor may be centralized or distributed, whether locally or remotely. Processors may interchangeably refer to any type of electronic control circuitry configured to execute programmed software instructions. The programmed instructions may be high-level software instructions, compiled software instructions, assembly-language software instructions, object code, binary code, micro-code, or the like. The programmed instructions may reside in internal or external memory or may be hard-coded as a state machine or set of control signals. According to methods and devices referenced herein, one or more embodiments describe software executable by the processor, which when executed, carries out one or more of the method acts.

The present application discusses several embodiments that include or otherwise cooperate with one or more computing devices. It is recognized that these computing devices are arranged to perform one or more algorithms to implement various concepts taught herein. Each of said algorithms is understood to be a finite sequence of steps for solving a logical or mathematical problem or performing a task. Any or all of the algorithms taught in the present disclosure may be demonstrated by formulas, flow charts, data flow diagrams, narratives in the specification, and other such means as evident in the present disclosure. Along these lines, the structures to carry out the algorithms disclosed herein include at least one processing device executing at least one software instruction retrieved from at least one memory device. The structures may, as the case may be, further include suitable input circuits known to one of skill in the art (e.g., keyboards, buttons, memory devices, communication circuits, touch screen inputs, and any other integrated and peripheral circuit inputs (e.g., accelerometers, thermometers, light detection circuits and other such sensors)), suitable output circuits known to one of skill in the art (e.g., displays, light sources, audio devices, tactile devices, control signals, switches, relays, and the like), and any additional circuits or other structures taught in the present disclosure. To this end, every invocation of means or step plus function elements in any of the claims, if so desired, will be expressly recited.

As known by one skilled in the art, a computing device has one or more memories, and each memory comprises any combination of volatile and non-volatile computer-readable media for reading and writing. Volatile computer-readable media includes, for example, random access memory (RAM). Non-volatile computer-readable media includes, for example, read only memory (ROM), magnetic media such as a hard-disk, an optical disk, a flash memory device, and/or the like. In some cases, a particular memory is separated virtually or physically into separate areas, such as a first memory, a second memory, a third memory, etc. In these cases, it is understood that the different divisions of memory may be in different devices or embodied in a single memory. The memory in some cases is a non-transitory computer medium configured to store software instructions arranged to be executed by a processor. Some or all of the stored contents of a memory may include software instructions executable by a processing device to carry out one or more particular acts.

The computing devices illustrated herein may further include operative software found in a conventional computing device such as an operating system or task loop, software drivers to direct operations through I/O circuitry, networking circuitry, and other peripheral component circuitry. In addition, the computing devices may include operative application software such as network software for communicating with other computing devices, database software for building and maintaining databases, and task management software where appropriate for distributing the communication and/or operational workload amongst various processors. In some cases, the computing device is a single hardware machine having at least some of the hardware and software listed herein, and in other cases, the computing device is a networked collection of hardware and software machines working together in a server farm to execute the functions of one or more embodiments described herein. Some aspects of the conventional hardware and software of the computing device are not shown in the figures for simplicity.

It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In other words, when so arranged as described herein, each computing device may be transformed from a generic and unspecific computing device to a combination device arranged comprising hardware and software configured for a specific and particular purpose such as to provide a determined technical solution. And when so arranged as described herein, to the extent that any of the inventive concepts described herein are found by a body of competent adjudication to be subsumed in an abstract idea, the ordered combination of elements and limitations are expressly presented to provide a requisite inventive concept by transforming the abstract idea into a tangible and concrete practical application of that abstract idea.

The embodiments described herein use computerized technology to improve the technology of collision avoidance, but other techniques and tools remain available to avoid collisions. Therefore, the claimed subject matter does not foreclose the whole or even substantial collision avoidance technological area. The innovation described herein uses both new and known building blocks combined in new and useful ways along with other structures and limitations to create something more than has heretofore been conventionally known. The embodiments improve on computing systems which, when un-programmed or differently programmed, cannot perform or provide the specific near-miss detection features claimed herein. The embodiments described in the present disclosure improve upon known collision avoidance processes and techniques. The computerized acts described in the embodiments herein are not purely conventional and are not well understood. Instead, the acts are new to the industry. Furthermore, the combination of acts as described in conjunction with the present embodiments provides new information, motivation, and business results that are not already present when the acts are considered separately. There is no prevailing, accepted definition for what constitutes an abstract idea. To the extent the concepts discussed in the present disclosure may be considered abstract, the claims present significantly more tangible, practical, and concrete applications of said allegedly abstract concepts. And said claims also improve previously known computer-based systems that perform collision avoidance operations.

Software may include a fully executable software program, a simple configuration data file, a link to additional directions, or any combination of known software types. When a computing device updates software, the update may be small or large. For example, in some cases, a computing device downloads a small configuration data file to as part of software, and in other cases, a computing device completely replaces most or all of the present software on itself or another computing device with a fresh version. In some cases, software, data, or software and data is encrypted, encoded, and/or otherwise compressed for reasons that include security, privacy, data transfer speed, data cost, or the like.

Database structures, if any are present in the near-miss detection systems described herein, may be formed in a single database or multiple databases. In some cases, hardware or software storage repositories are shared amongst various functions of the particular system or systems to which they are associated. A database may be formed as part of a local system or local area network. Alternatively, or in addition, a database may be formed remotely, such as within a distributed "cloud" computing system, which would be accessible via a wide area network or some other network.

Input/output (I/O) circuitry and user interface (UI) modules include serial ports, parallel ports, universal serial bus (USB) ports, IEEE 802.11 transceivers and other transceivers compliant with protocols administered by one or more standard-setting bodies, displays, projectors, printers, keyboards, computer mice, microphones, micro-electro-mechanical (MEMS) devices such as accelerometers, and the like.

In at least one embodiment, devices such as the aerially mounted node 102 may communicate with other devices via communication over a network. The network may involve an Internet connection or some other type of local area network (LAN) or wide area network (WAN). Non-limiting examples of structures that enable or form parts of a network include, but are not limited to, an Ethernet, twisted pair Ethernet, digital subscriber loop (DSL) devices, wireless LAN, Wi-Fi, Worldwide Interoperability for Microwave Access (WiMax), or the like.

In the present disclosure, memory may be used in one configuration or another. The memory may be configured to store data. In the alternative or in addition, the memory may be a non-transitory computer readable medium (CRM). The CRM is configured to store computing instructions executable by a processor of the aerially mounted node 102. The computing instructions may be stored individually or as groups of instructions in files. The files may include functions, services, libraries, and the like. The files may include one or more computer programs or may be part of a larger computer program. Alternatively, or in addition, each file may include data or other computational support material useful to carry out the computing functions of a near-miss detection system.

The terms, "real-time" or "real time," as used herein and in the claims that follow, are not intended to imply instantaneous processing, transmission, reception, or otherwise as the case may be. Instead, the terms, "real-time" and "real time" imply that the activity occurs over an acceptably short period of time (e.g., over a period of microseconds or milliseconds), and that the activity may be performed on an ongoing basis (e.g., collecting and analyzing video to detect or otherwise determine near-miss conditions). An example of an activity that is not real-time is one that occurs over an extended period of time (e.g., hours or days) or that occurs based on intervention or direction by a user or other activity.

Unless defined otherwise, the technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

In the present disclosure, when an element (e.g., component, circuit, device, apparatus, structure, layer, material, or the like) is referred to as being "on," "coupled to," or "connected to" another element, the elements can be directly on, directly coupled to, or directly connected to each other, or intervening elements may be present. In contrast, when an element is referred to as being "directly on," "directly coupled to," or "directly connected to" another element, there are no intervening elements present.

The terms "include" and "comprise" as well as derivatives and variations thereof, in all of their syntactic contexts, are to be construed without limitation in an open, inclusive sense, (e.g., "including, but not limited to"). The term "or," is inclusive, meaning and/or. The phrases "associated with" and "associated therewith," as well as derivatives thereof, can be understood as meaning to include, be included within, interconnect with, contain, be contained within, connect to or with, couple to or with, be communicable with, cooperate with, interleave, juxtapose, be proximate to, be bound to or with, have, have a property of, or the like.

Reference throughout this specification to "one embodiment" or "an embodiment" and variations thereof means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the present disclosure, the terms first, second, etc., may be used to describe various elements, however, these elements are not be limited by these terms unless the context clearly requires such limitation. These terms are only used to distinguish one element from another. For example, a first machine could be termed a second machine, and, similarly, a second machine could be termed a first machine, without departing from the scope of the inventive concept.

The singular forms "a," "an," and "the" in the present disclosure include plural referents unless the content and context clearly dictates otherwise. The conjunctive terms, "and" and "or," are generally employed in the broadest sense to include "and/or" unless the content and context clearly dictates inclusivity or exclusivity as the case may be. The composition of "and" and "or" when recited herein as "and/or" encompasses an embodiment that includes all of the elements associated thereto and at least one more alternative embodiment that includes fewer than all of the elements associated thereto.

In the present disclosure, conjunctive lists make use of a comma, which may be known as an Oxford comma, a Harvard comma, a serial comma, or another like term. Such lists are intended to connect words, clauses or sentences such that the thing following the comma is also included in the list.

The term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the description merely provides one or more illustrative examples and claimed subject matter is not limited to these one or more illustrative examples; however, again, particular context of description and/or usage provides helpful guidance regarding inferences to be drawn.

In the description herein, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order to avoid obscuring the description with unnecessary detail. Thus, the present disclosure is not intended to be limited to the embodiments shown, but is instead to be accorded the widest scope consistent with the principles and features disclosed herein. Hence, these and other changes can be made to the embodiments in light of the above-detailed description. In general, in the following claims, the terms used should not be construed to limit the claims to the specific embodiments disclosed in the specification, but should be construed to include all possible embodiments along with the full scope of equivalents to which such claims are entitled. Accordingly, the claims are not limited by the disclosure.

What is claimed is:

1. A method performed by one or more computing devices, the method comprising:
    identifying objects of interest in a series of images captured within a field of view of a camera, wherein each image of the series of images includes a set of pixels, wherein one or more pixels of the set of pixels correspond to a grid point of a geocoordinate grid;
    determining movements of the objects of interest through the series of images;
    identifying directions of travel of the objects of interest through grid points of the geocoordinate grid based on the determined movements;
    determining a variance of the direction of travel for each of the objects of interest to produce a plurality of travel direction variances;
    determining a vector of median direction of travel for each of a plurality of vector points corresponding to the objects of interest on the geocoordinate grid to produce a plurality of vectors;
    determining a plurality of candidate locations for placement of a virtual tripwire on grid points of the geocoordinate grid to monitor movement of at least some of the objects of interest through the series of images, the virtual tripwire including a virtual line segment extending in a direction approximately orthogonal to the direction of travel for at least one of the objects of interest; and
    automatically selecting a particular candidate location for placement of the virtual tripwire, wherein the particular candidate location is selected from the plurality of candidate locations based on the plurality of vectors and the plurality of travel direction variances.

2. The method of claim 1, wherein automatically selecting a particular candidate location for placement of the virtual tripwire includes moving a sliding window across grid points of the geocoordinate grid to identify a location that results in a minimization of the variance of the direction of travel for at least one object of interest at grid points overlapping the sliding window.

3. The method of claim 2, further comprising:
    placing the virtual tripwire across selected grid points of the geocoordinate grid at a location within the sliding window that results in the minimization of the variance of the direction of travel for at least one object of interest at the selected grid points.

4. The method of claim 1, wherein the series of images are obtained by sampling video from the camera.

5. The method of claim 1, wherein the objects of interest include at least one of vehicles, bicycles, and pedestrians.

6. The method of claim 1, further comprising:
    estimating a velocity of at least one object of interest crossing the virtual tripwire for a defined time interval based on respective locations of pixels corresponding to the at least one object of interest in successive images.

7. The method of claim 1, further comprising:
    counting how many of the objects of interest cross the virtual tripwire for a defined time interval.

8. The method of claim 1, further comprising:
    determining geocoordinates for a bounding perimeter for each of the objects of interest.

9. A method performed by a computing device located remotely from at least one aerially mounted node, the method comprising:
    receiving, from the at least one aerially mounted node, at least one message including a set of geocoordinates corresponding to grid points on a geocoordinate grid, the set of geocoordinates representing points on or within bounding perimeters for objects of interest present in a series of images captured by at least one camera of the at least one aerially mounted node;
    determining movements of the objects of interest through the series of images;
    identifying directions of travel of the objects of interest through the grid points based on the determined movements;
    determining a variance of the direction of travel for each of the objects of interest to produce a plurality of travel direction variances;
    determining a vector of median direction of travel for each of a plurality of vector points corresponding to the objects of interest on the geocoordinate grid to produce a plurality of vectors;
    determining a plurality of candidate locations for placement of a virtual tripwire on at least some of the grid points to monitor movement of at least some of the objects of interest through the series of images, the virtual tripwire including a virtual line segment extending in a direction approximately orthogonal to the direction of travel for at least one of the objects of interest; and automatically selecting a particular candidate location for placement of the virtual tripwire, wherein the particular candidate location is selected from the plurality of candidate locations based on the plurality of vectors and the plurality of travel direction variances.

10. The method of claim 9, wherein automatically selecting a particular candidate location for placement of the virtual tripwire includes moving a sliding window across at least some of the grid points to identify a location that results in a minimization of the variance of the direction of travel for at least one object of interest at grid points overlapping the sliding window.

11. The method of claim 9, further comprising:
placing the virtual tripwire across a selected set of grid points at a location within the sliding window that results in the minimization of the variance of direction of travel for at least one object of interest at the selected grid points.

12. The method of claim 9, wherein automatically selecting a particular candidate location for placement of the virtual tripwire includes moving a sliding window across at least some of the grid points to identify a location that results in a relatively smallest variance of the direction of travel for at least one object of interest at grid points overlapping the sliding window.

13. The method of claim 9, further comprising:
estimating a velocity of at least one object of interest crossing the virtual tripwire for a defined time interval based on respective locations of pixels corresponding to the at least one object of interest in successive images.

14. A system comprising:
an aerially mounted node that includes a video camera and a first processor, wherein the first processor is operable to:
  identify objects of interest in a series of images captured within a field of view of the video camera, wherein each image of the series of images includes a set of pixels, wherein one or more pixels of the set of pixels correspond to a grid point of a geocoordinate grid;
  determine bounding perimeters for the objects of interest in at least one image of the series of images, wherein each bounding perimeter surrounds a respective object of interest;
  determine a set of geocoordinates corresponding to grid points on the geocoordinate grid, the set of geocoordinates representing points on or within bounding perimeters for the objects of interest; and
  transmit at least one message that includes the set of geocoordinates; and
a computing device that is located remotely from the aerially mounted node and includes a second processor, wherein the second processor is operable to:
  receive the at least one message from the first processor;
  determine movements of the objects of interest through the series of images;
  identify directions of travel of the objects of interest through the grid points based on the determined movements;
  determine a variance of the direction of travel for each of the objects of interest to produce a plurality of travel direction variances;
  determine a vector of median direction of travel for each of a plurality of vector points corresponding to the objects of interest on the geocoordinate grid to produce a plurality of vectors;
  determine a plurality of candidate locations for placement of a virtual tripwire on at least some of the set of grid points to monitor movement of at least some of the objects of interest through the series of images, the virtual tripwire including a virtual line segment extending in a direction approximately orthogonal to the direction of travel for at least one of the objects of interest; and
  automatically select a particular candidate location for placement of the virtual tripwire, wherein the particular candidate location is selected from the plurality of candidate locations based on the plurality of vectors and on the plurality of travel direction variances.

15. The system of claim 14, wherein the second processor is operable to automatically select a particular candidate location for placement of the virtual tripwire by moving a sliding window across at least some of the grid points to identify a location that results in a minimization of the variance of the direction of travel for at least one object of interest at grid points overlapping the sliding window.

16. The system of claim 15, wherein the second processor is further operable to place the virtual tripwire across a selected set of grid points at a location within the sliding window that results in the minimization of the variance of direction of travel for at least one object of interest at the selected grid points.

17. The system of claim 14, wherein the second processor is operable to automatically select a particular candidate location for placement of the virtual tripwire by moving a sliding window across at least some of the grid points to identify a location that results in a relatively smallest variance of the direction of travel for at least one object of interest at grid points overlapping the sliding window.

18. The system of claim 14, wherein the second processor is further operable to estimate a velocity of at least one of object of interest crossing the virtual tripwire for a defined time interval based on respective locations of pixels corresponding to the at least one object of interest in successive images.

19. The system of claim 14, wherein the second processor is further operable to count how many of the objects of interest cross the virtual tripwire for a defined time interval.

20. The system of claim 14, wherein the objects of interest include at least one of vehicles, bicycles, and pedestrians.

* * * * *